US008818722B2

(12) United States Patent
Elgersma et al.

(10) Patent No.: US 8,818,722 B2
(45) Date of Patent: Aug. 26, 2014

(54) RAPID LIDAR IMAGE CORRELATION FOR GROUND NAVIGATION

(75) Inventors: Michael R. Elgersma, Plymouth, MN (US); Yunqian Ma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 61 days.

(21) Appl. No.: 13/302,831

(22) Filed: Nov. 22, 2011

(65) Prior Publication Data

US 2013/0131984 A1  May 23, 2013

(51) Int. Cl.
*G01S 17/89* (2006.01)

(52) U.S. Cl.
USPC .............. 701/514; 701/28; 701/448; 701/501

(58) Field of Classification Search
CPC ......... G01S 17/89; G01S 7/48; G06T 7/0083; G06T 7/0085
USPC ................................... 701/514; 382/232, 199
See application file for complete search history.

(56) References Cited

U.S. PATENT DOCUMENTS

| 5,045,860 | A | 9/1991 | Hodson |
| 5,087,916 | A | 2/1992 | Metzdorff et al. |
| 5,257,347 | A | 10/1993 | Busbridge et al. |
| 5,563,513 | A | 10/1996 | Tasci et al. |
| 5,596,659 | A | 1/1997 | Normile et al. |
| 5,649,030 | A | 7/1997 | Normile et al. |
| 5,755,400 | A | * | 5/1998 | Kalms, III ..................... 244/3.17 |
| 5,822,465 | A | 10/1998 | Normile et al. |
| 5,878,373 | A | 3/1999 | Cohen et al. |
| 6,218,980 | B1 | 4/2001 | Goebel et al. |
| 6,282,362 | B1 | 8/2001 | Murphy et al. |
| 6,389,354 | B1 | 5/2002 | Hicks et al. |
| 6,400,313 | B1 | 6/2002 | Morici et al. |
| 6,912,464 | B1 | 6/2005 | Parker |
| 7,446,766 | B2 | 11/2008 | Moravec |

(Continued)

FOREIGN PATENT DOCUMENTS

| GB | 2162014 | 1/1986 |
| WO | 2007028932 | 3/2007 |

OTHER PUBLICATIONS

Alfano et al., "Capacity of MIMO Channels with One-sided Correlation", "ISSSTA2004", Aug. 30-Sep. 2, 2004, pp. 515-519, Publisher: IEEE, Published in: AU.

(Continued)

*Primary Examiner* — Helal A Algahaim
*Assistant Examiner* — Charles J Han
(74) *Attorney, Agent, or Firm* — Fogg & Powers LLC

(57) ABSTRACT

A method includes generating current coarse edge count representation based on current fine grid representation of current section, correlating current edge quantity values of current coarse pixels with historical edge quantity values of historical coarse pixels of historical coarse edge count representation of environment, and identifying first subsection of historical coarse edge count representation with highest correlation to current coarse edge count representation. Each current coarse pixel in current coarse edge count representation represents current fine pixels from current fine grid representation. Fine grid representation of current section of environment is based on data from range and attitude sensor. Each current coarse pixel within current coarse edge count representation includes current edge quantity value that represents quantity of current fine pixels represented by current coarse pixel that include edge. Each historical coarse pixel corresponds to historical fine pixels in historical fine grid representation of environment.

20 Claims, 24 Drawing Sheets

(56) References Cited

U.S. PATENT DOCUMENTS

| | | | |
|---|---|---|---|
| 7,584,020 B2 | 9/2009 | Bruemmer et al. | |
| 7,719,664 B1* | 5/2010 | Flowers | 356/29 |
| 8,427,472 B2 | 4/2013 | Moravec | |
| 8,463,036 B1* | 6/2013 | Ramesh et al. | 382/170 |
| 2002/0147544 A1 | 10/2002 | Nicosia et al. | |
| 2002/0181762 A1* | 12/2002 | Silber | 382/154 |
| 2004/0145496 A1 | 7/2004 | Ellis | |
| 2004/0167717 A1 | 8/2004 | Buchanan et al. | |
| 2004/0178945 A1 | 9/2004 | Buchanan | |
| 2006/0044431 A1* | 3/2006 | Ovsiannikov | 348/294 |
| 2006/0125680 A1 | 6/2006 | Thackray | |
| 2006/0157639 A1 | 7/2006 | Shaffer et al. | |
| 2006/0178828 A1 | 8/2006 | Moravec | |
| 2007/0046448 A1* | 3/2007 | Smitherman | 340/431 |
| 2008/0009966 A1 | 1/2008 | Bruemmer et al. | |
| 2008/0035834 A1 | 2/2008 | Gleckler | |
| 2008/0086236 A1 | 4/2008 | Saito et al. | |
| 2008/0100822 A1 | 5/2008 | Munro | |
| 2008/0103699 A1 | 5/2008 | Hanna et al. | |
| 2008/0169964 A1 | 7/2008 | Hawkinson | |
| 2008/0181487 A1 | 7/2008 | Hsu et al. | |
| 2008/0231504 A1 | 9/2008 | Sartor et al. | |
| 2008/0232709 A1 | 9/2008 | Rahmes et al. | |
| 2008/0234981 A1 | 9/2008 | Sartor et al. | |
| 2008/0273752 A1 | 11/2008 | Zhu et al. | |
| 2009/0103779 A1 | 4/2009 | Loehlein et al. | |
| 2009/0119010 A1 | 5/2009 | Moravec | |
| 2009/0238473 A1 | 9/2009 | McKitterick | |
| 2009/0322742 A1 | 12/2009 | Muktinutalapati et al. | |
| 2010/0017060 A1 | 1/2010 | Zhang et al. | |
| 2010/0063730 A1 | 3/2010 | Case et al. | |
| 2011/0026837 A1 | 2/2011 | Kita | |
| 2011/0060478 A1 | 3/2011 | Nickolaou | |
| 2011/0069175 A1 | 3/2011 | Mistretta et al. | |
| 2011/0243476 A1 | 10/2011 | Sieracki | |
| 2011/0254833 A1 | 10/2011 | McDaniel et al. | |
| 2012/0150441 A1 | 6/2012 | Ma et al. | |
| 2014/0025331 A1 | 1/2014 | Ma et al. | |

OTHER PUBLICATIONS

Delmarco et al., "Application of a Dynamic Feature Selection Algorithm to Multi-Sensor Image Registration", Apr. 9, 2007, pp. 1-12, vol. 6567, No. 17.

Nieto, "Scan-SLAM: Combining EKF-SLAM and Scan Correlation", "Proceedings of International Conference on Field and Service Robotics", Jul. 2005, pp. 1-12.

Novak, "Correlation Algorithms for Radar Map Matching", "IEEE Transactions on Aerospace and Electronic Systems", Jul. 1978, pp. 641-648, vol. AES-14, No. 4, Publisher: IEEE.

Novak, "Radar Detection and Map-Matching Algorithm Studies", "IEEE Transactions on Aerospace and Electronic Systems", Sep. 1980, pp. 620-625, vol. AES16, No. 5, Publisher: IEEE.

Ma et al, "Systems and Methods for Navigation Using Cross Correlation on Evidence Grids", Filed on Dec. 9, 2010, , pp. 1-25.

European Patent Office, "Communication under Rule 71(3) EPC", "from Foreign Counterpart of U.S. Appl. No. 12/963,893", Feb. 15, 2013, pp. 1-29, Published in: EP.

European Patent Office, "Office Action", "from Foreign Counterpart of U.S. Appl. No. 12/963,893", Sep. 5, 2012, pp. 1-5, Published in: EP.

European Patent Office, "European Search Report", "from Foreign Counterpart of U.S. Appl. No. 12/963,893", Jun. 28, 2012, pp. 1-3, Published in: EP.

U.S. Patent and Trademark Office, "Office Action", "U.S. Appl. No. 12/963,893", Jun. 13, 2013, pp. 1-43.

Kulich et al. , "Robust Data Fusion With Occupancy Grid", "IEEE Transactions on Systems, Man and Cybernetics: Part C: Applications and Reviews", Feb. 1, 2005, pp. 106-115, vol. 35, No. 1, Publisher: IEEE Service Center.

Gerlek, "Compressing Lidar Data", "Photogrammetric Engineering & Remote Sensing", Nov. 2009, pp. 1253-1255.

Ma et al., "Systems and Methods for Correlating Reduced Evidence Grids", U.S. Appl. No. 13/552,174, filed on Jul. 18, 2012, pp. 1-40.

European Patent Office, "Office Action", "from Foreign Counterpart of U.S. Appl. No. 13/302,831", Oct. 1, 2013, pp. 1-6, Published in: EP.

European Patent Office, "European Search Report", "from Foreign Counterpart of U.S. Appl. No. 13/302,831", Sep. 11, 2013, pp. 1-3, Published in: EP.

U.S. Patent and Trademark Office, "Office Action", "from U.S. Appl. No. 12/963,893", Nov. 20, 2013, pp. 1-21, Published in: US.

European Patent Office, "European Search Report from EP Application No. 131756041 mailed Nov. 4, 2013", "from Foreign Counterpart of U.S. Appl. No. 13/552,174", Nov. 4, 2013, pp. 14, Published in: EP.

Elfes, "Using Occupancy Grids for Mobile Robot Perception and Navigation", Jun. 1989, pp. 46-57, Publisher: IEEE.

Martin et al., "Robot Evidence Grids", Mar. 1996, Title Page and pp. 148, Publisher: Carnegie Mellon University, Published in: US.

European Patent Office, "Office Action from EP Application No. 13175604.1 mailed Nov. 26, 2013", "from Foreign Counterpart of U.S. Appl. No. 13/552,174", Nov. 26, 2013, pp. 17, Published in: EP.

U.S. Patent and Trademark Office, "Notice of Allowance", "from U.S. Appl. No. 12/963,893", Jun. 6, 2014, pp. 112, Published in: US.

* cited by examiner

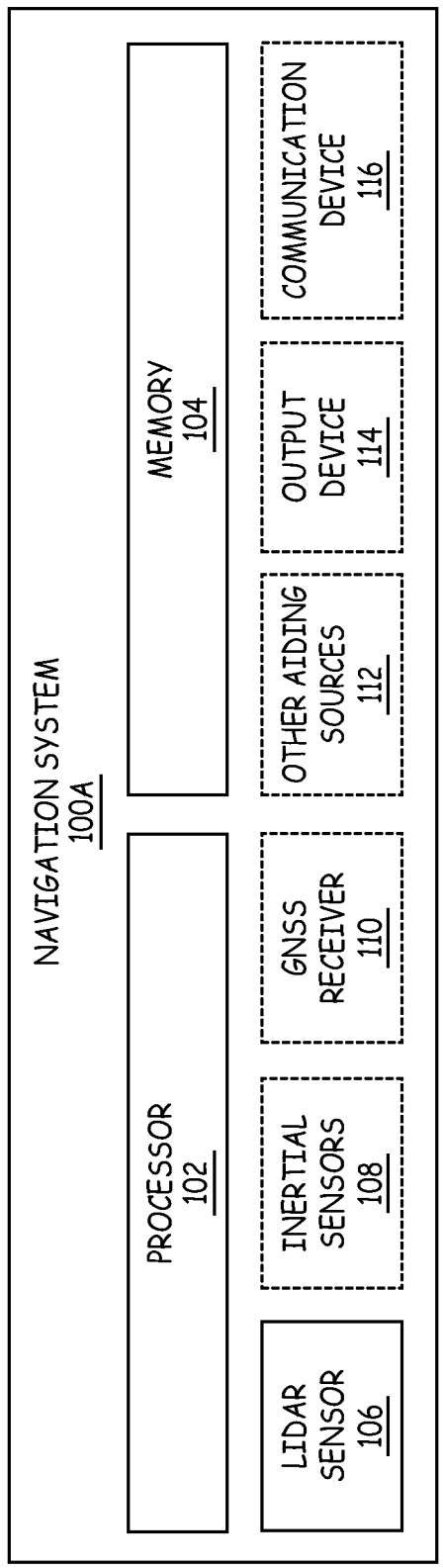

300C

| 5 | 4 | 4 | 4 | 4 | 4 | 4 | 4 | 4 | 3 | 4 | 6 | 4 | 8 | 5 | 0 |
|---|---|---|---|---|---|---|---|---|---|---|---|---|---|---|---|
| 4 | 0 | 0 | 0 | 0 | 0 | 0 | 3 | 13| 4 | 4 | 3 | 0 | 6 | 4 | 3 |
| 4 | 0 | 0 | 0 | 0 | 0 | 0 | 0 | 2 | 4 | 4 | 0 | 0 | 0 | 0 | 4 |
| 4 | 0 | 0 | 0 | 0 | 0 | 0 | 0 | 0 | 5 | 5 | 2 | 0 | 0 | 0 | 4 |
| 4 | 0 | 0 | 0 | 0 | 0 | 0 | 0 | 0 | 0 | 0 | 2 | 2 | 0 | 0 | 4 |
| 4 | 0 | 0 | 0 | 0 | 0 | 0 | 0 | 0 | 0 | 0 | 0 | 2 | 2 | 0 | 4 |
| 4 | 0 | 0 | 0 | 0 | 0 | 0 | 0 | 0 | 0 | 0 | 0 | 0 | 2 | 4 | 5 |
| 4 | 0 | 0 | 0 | 0 | 0 | 0 | 0 | 0 | 0 | 3 | 8 | 0 | 5 | 4 | 2 |
| 3 | 5 | 0 | 0 | 0 | 6 | 4 | 7 | 4 | 4 | 8 | 9 | 0 | 4 | 0 | 0 |
| 0 | 3 | 4 | 4 | 4 | 2 | 0 | 5 | 5 | 0 | 4 | 0 | 0 | 4 | 0 | 0 |
| 0 | 0 | 0 | 0 | 0 | 0 | 0 | 0 | 4 | 4 | 4 | 0 | 0 | 2 | 4 | 2 |
| 0 | 6 | 8 | 5 | 7 | 4 | 0 | 0 | 0 | 0 | 0 | 0 | 0 | 9 | 2 | 0 |
| 0 | 3 | 4 | 2 | 0 | 1 | 4 | 1 | 0 | 0 | 1 | 5 | 0 | 9 | 0 | 0 |
| 0 | 0 | 0 | 0 | 0 | 2 | 8 | 5 | 0 | 0 | 7 | 10| 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 3C

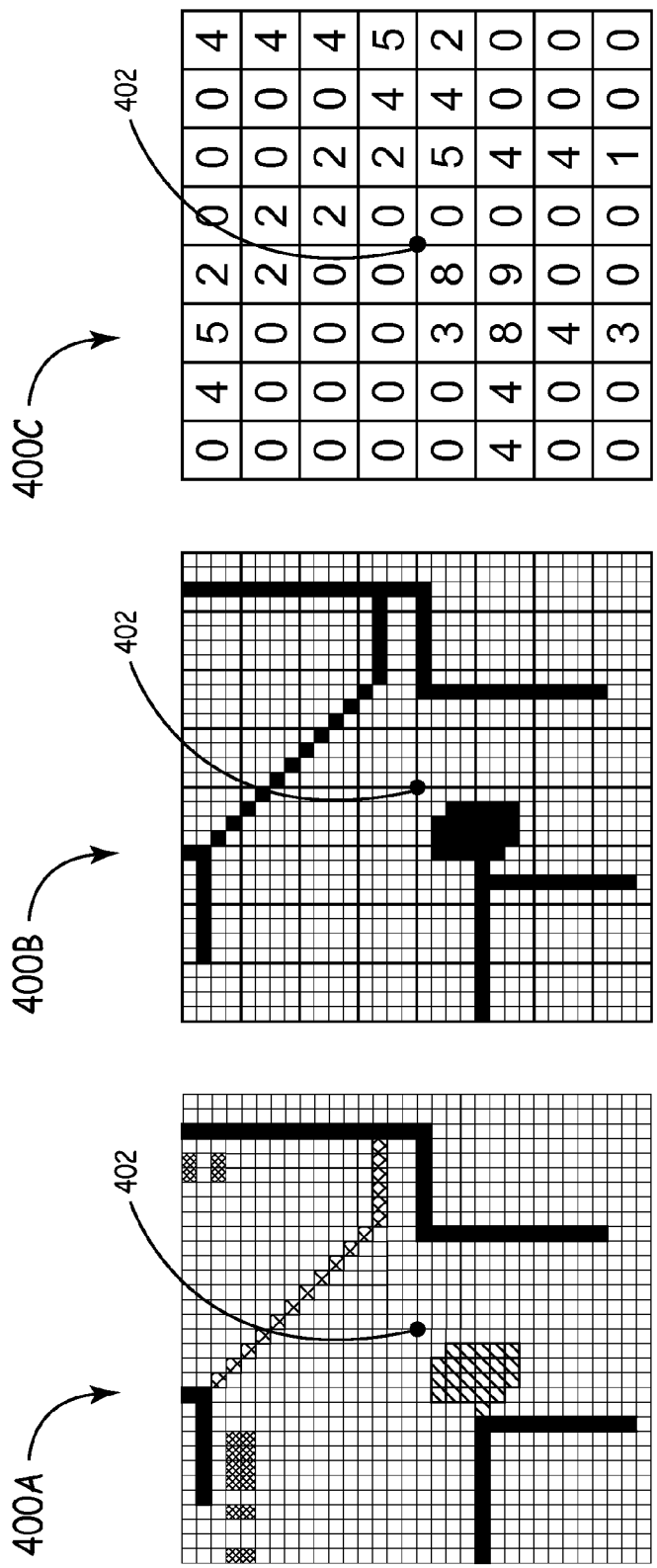

FIG. 5A

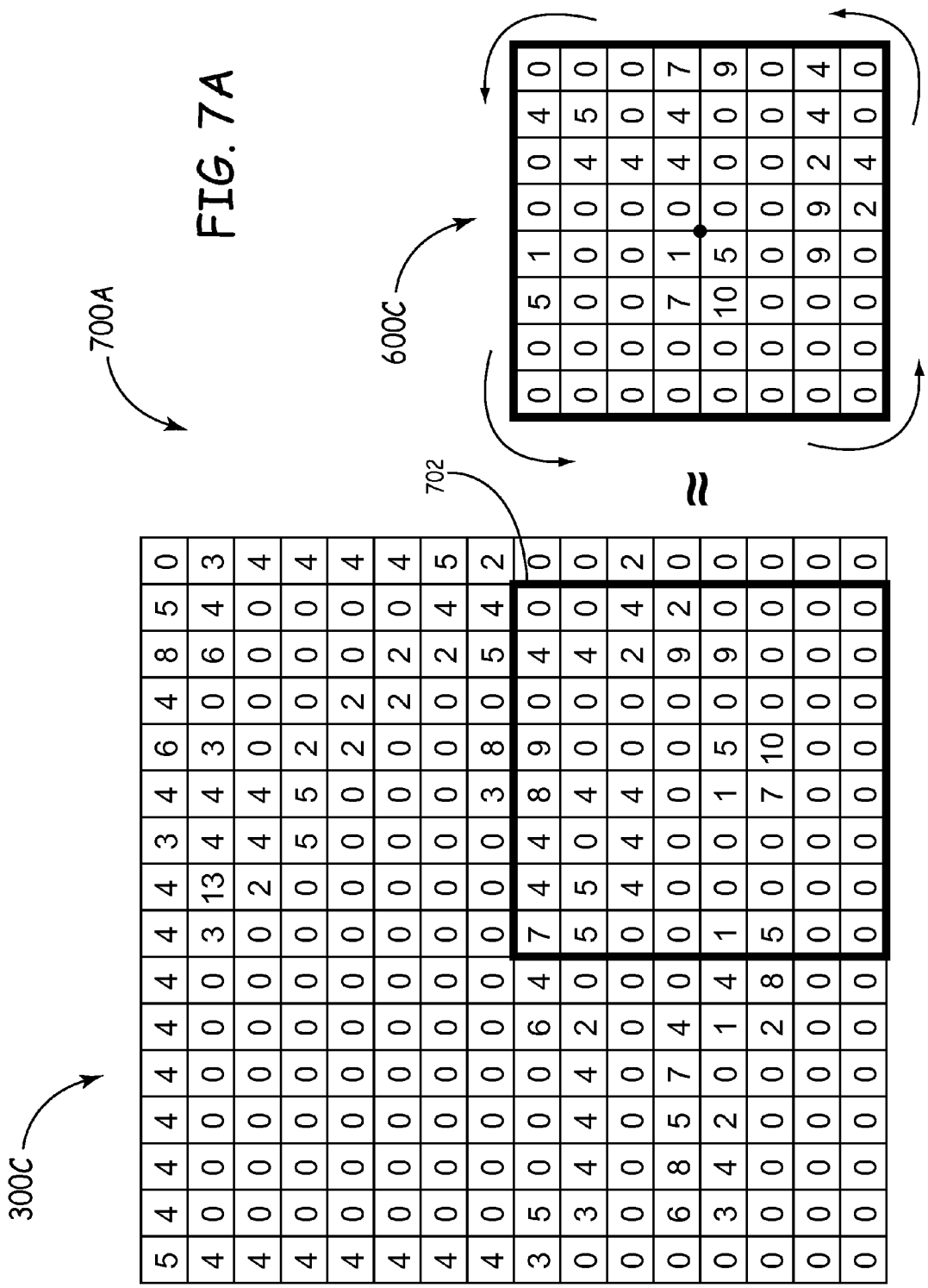

1200A
1200B
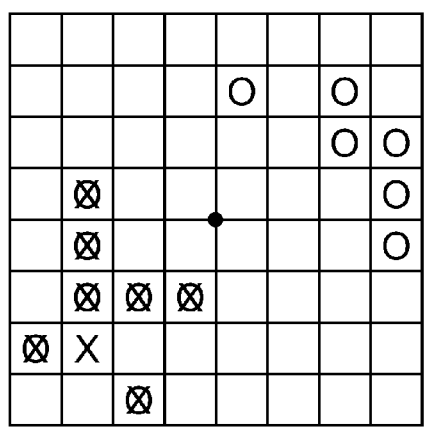
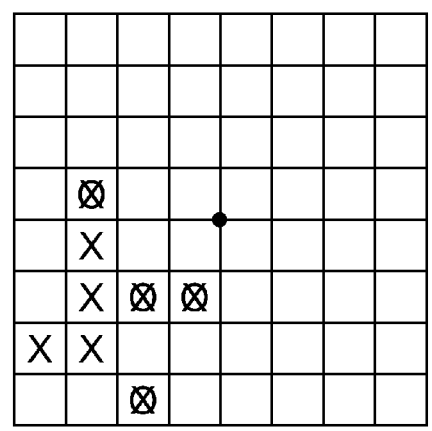
FIG. 12A
FIG. 12B

RAPID LIDAR IMAGE CORRELATION FOR GROUND NAVIGATION

CROSS-REFERENCE TO RELATED APPLICATIONS

This application is related to the following co-pending United States patent application, which is hereby incorporated herein by reference:

U.S. patent application Ser. No. 12/963,893 entitled "SYSTEMS AND METHODS FOR NAVIGATION USING CROSS CORRELATION ON EVIDENCE GRIDS" filed on Dec. 9, 2010 and which is referred to herein as the '893 application.

BACKGROUND

Various systems have been developed to provide location, velocity, and/or attitude information of an object to a user. Inertial based navigation systems (INS) that track changes in location and attitude from an initial point are capable of providing location, velocity, and/or attitude information that is accurate and low in noise. Inertial navigation systems (INS) use inertial measurement units (IMU) to create navigation solutions for objects, including vehicles and human mounted objects. IMUs measure acceleration and rotation rates. Processor can integrate the acceleration and rotation rates determined by an IMU over time to estimate the location and attitude of an object. As an object travels for an extended period of time, errors in the measurements may arise and accumulate, causing the estimated location and attitude of the object to "drift" from the object's actual location and attitude. To correct for these errors, external systems, such as global navigation satellite systems (GNSS) (for example, global positioning system (GPS)), are capable of providing low drift information, but the data tends to be noisy and subject to radio propagation error such as multipath.

Light detection and ranging (LIDAR) sensors and systems are able to generate representations of a surrounding environment. LIDAR systems are able to produce large quantities of data and enable detailed representations of environments. The large quantities of data can be difficult to manage and can take long times to manipulate. The data regarding a current representation of an environment can be correlated against historical data representing a larger area to determine where in the larger area the LIDAR system currently resides. One particular problem with the large quantities of data produced by LIDAR systems is that is it time consuming to determine a current location by correlating data regarding the current location generated by the LIDAR with a historical map. It is particularly time consuming to initialize the system to find the current location initially. Once the currently location is initially located, it does not take as much time to incrementally update based on the LIDAR data.

SUMMARY

A method includes generating a current coarse edge count representation of a current section of an environment based on a current fine grid representation of the current section of the environment. Each current coarse pixel in the current coarse edge count representation represents a plurality of current fine pixels from the current fine grid representation. The fine grid representation of the current section of the environment is based on data from a range and attitude sensor capable of generating signals relating to a location of at least one object in a current section of the environment. Each current coarse pixel within the current coarse edge count representation includes a current edge quantity value that represents the quantity of the plurality of current fine pixels from the current fine grid representation represented by the current coarse pixel that include an edge. The method also includes correlating the current edge quantity values of the current coarse pixels of the current coarse edge count representation with historical edge quantity values of historical coarse pixels of a historical coarse edge count representation of the environment. Each historical coarse pixel in the historical coarse edge count representation corresponds to a plurality of historical fine pixels in a historical fine grid representation of the environment. The method also includes identifying a first subsection of the historical coarse edge count representation that has the highest correlation to the current coarse edge count representation.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 1A-1B are block diagrams depicting exemplary embodiments of navigation systems implementing rapid image correlation for navigation;

FIGS. 3A-3C are exemplary historical representations of the environment of FIG. 2 as generated by the navigation system of FIG. 1;

FIGS. 4A-4C are exemplary representations of a first current section of the environment of FIG. 2;

FIGS. 5A-5C are exemplary representations of the results of a correlation between a first current coarse edge count representation of the first current section and a historical coarse edge count representation of the environment of FIG. 2;

FIGS. 7A-7C are exemplary representations of the results of a correlation between a second current coarse edge count representation of the second current section and a historical coarse edge count representation of the environment of FIG. 2;

FIGS. 12A-12B are exemplary representations of historical and current data used for correlation.

Figure 1B:
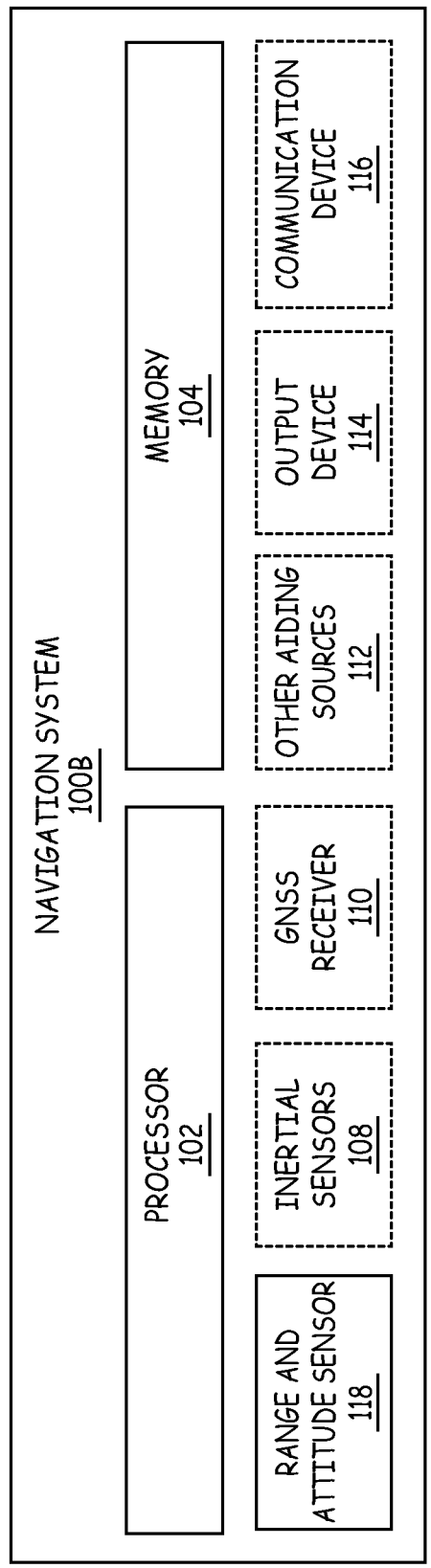

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIGS. 1A-1B are block diagrams depicting exemplary embodiments of navigation systems 100 implementing rapid image correlation for navigation. Each of FIGS. 1A-1B illustrates a different embodiment of navigation systems 100, labeled 100A-100B respectively.

FIG. 1A is a block diagram depicting an exemplary embodiment of a navigation system 100A implementing rapid LIDAR image correlation for ground navigation. Exemplary navigation system 100 includes a processor 102, memory 104, and a LIDAR sensor 106. In some embodiments, the navigation system 100 also includes one or more optional inertial sensors 108, a global navigation satellite systems (GNSS) receiver 110 (for example, global positioning system (GPS)), other aiding sources 112, and output device 114. While the system is described for use in ground navigation of a vehicle, person, or other object, it is understood that it could be used for air, sea, or space navigation as well.

In exemplary embodiments, LIDAR sensor 106 is operable to determine both range and angle information for a plurality of objects in an environment. In other embodiments, such as those described with respect to FIG. 1B below, the LIDAR sensor 106 is replaced with other ranging and attitude determination sensors, such as a radio detection and ranging (RADAR) sensor, a sound navigation and ranging (SONAR) sensor, or other sensors capable of ranging and attitude determination, such as other electromagnetic or acoustic ranging sensors.

In exemplary embodiments, the LIDAR sensor includes a plurality of laser and photodetector pairs (such as 64 pairs) mounted vertically and directed at various angles (various azimuths). In exemplary embodiments, the vertically mounted lasers are scanned by spinning around a vertical axis at a rate (such as 10 times per second). In exemplary embodiments, the light emitted from the lasers reflects off of objects back to the photodetectors. The time between emission from the laser and reception at the photodetector is used to calculate the range of the object that reflected the light. In exemplary embodiments, the LIDAR sensor 106 outputs raw sensor data describing the environment in polar coordinates.

In exemplary embodiments, memory 104 stores the raw sensor data received from the LIDAR sensor 106. In exemplary embodiments, the processor 102 converts the raw sensor data from polar coordinates to Cartesian coordinates. In other exemplary embodiments, this conversion is done by another element of navigation system 100, such as another processor or the LIDAR sensor 106 itself, and provided to the processor 102. In other exemplary embodiments, no polar to Cartesian conversion is performed and the subsequent calculations are performed using polar coordinates. In exemplary embodiments, the Cartesian coordinates are stored in memory 104.

In exemplary embodiments, processor 102 is operable to process and manipulate the raw sensor data to perform rapid LIDAR image correlation. Specifically, processor 102 generates both fine and coarse grid representations of both historical sensor data and current sensor data. The coarse grid representations of the current sensor data and the historical sensor data can be more quickly correlated to find the general area of the current location within the historical sensor data as described below.

Once the general area of the current location is determined, then the fine grid representation of the current sensor data is correlated with the fine grid representation of the historical sensor data to determine the precise location of the navigation system 100 within the environment.

In exemplary embodiments having inertial sensors 108, inertial sensor data from the inertial sensors 108 relevant to the current attitude of the system 100 is used to compensate for tilting or rotation of the system 100 and LIDAR sensor 106 during operation. Thus, the system 100 can compensate for tilting and rotation of the system 100 and LIDAR sensor 108 as the system 100 moves across terrain (while on a vehicle, on an object, or attached to a person) that causes its attitude with respect to the ground to change.

In exemplary embodiments having other navigation and aiding sources, such as one or more optional inertial sensors 108, optional GNSS receiver 110, and optional other aiding sources 112, the location based on the LIDAR data is fused with location data from the other navigation and aiding sources using a Kalman filter, Extended Kalman Filter (EKF), or other appropriate state estimator or data fusion algorithm or technique. In exemplary embodiments, the Kalman filter estimates and corrects errors in the navigation solution based on data from the LIDAR sensor 106, the one or more optional inertial sensors 108, the GNSS receiver 110, and the optional other aiding sources 112.

In exemplary embodiments, output device 114 outputs a navigation solution to a user interface. In exemplary embodiments, communication device 116 communicates a navigation solution as a signal that can be used by another system or device.

FIG. 1B is a block diagram depicting an exemplary embodiment of a navigation system 100B implementing rapid image correlation for navigation generally. Navigation system 100B includes similar components to navigation system 100A and operates according to similar principles and methods as navigation system 100A described above. The difference between navigation system 100B and navigation system 100A is that navigation system 100B includes a range and attitude sensor 118 generally instead of LIDAR sensor 106 as described in navigation system 100A above. In exemplary embodiments, the range and attitude sensor 118 includes any ranging and angle determination sensors, such as a RADAR sensor, a SONAR sensor, or another electromagnetic or acoustic ranging sensor.

Figure 2:
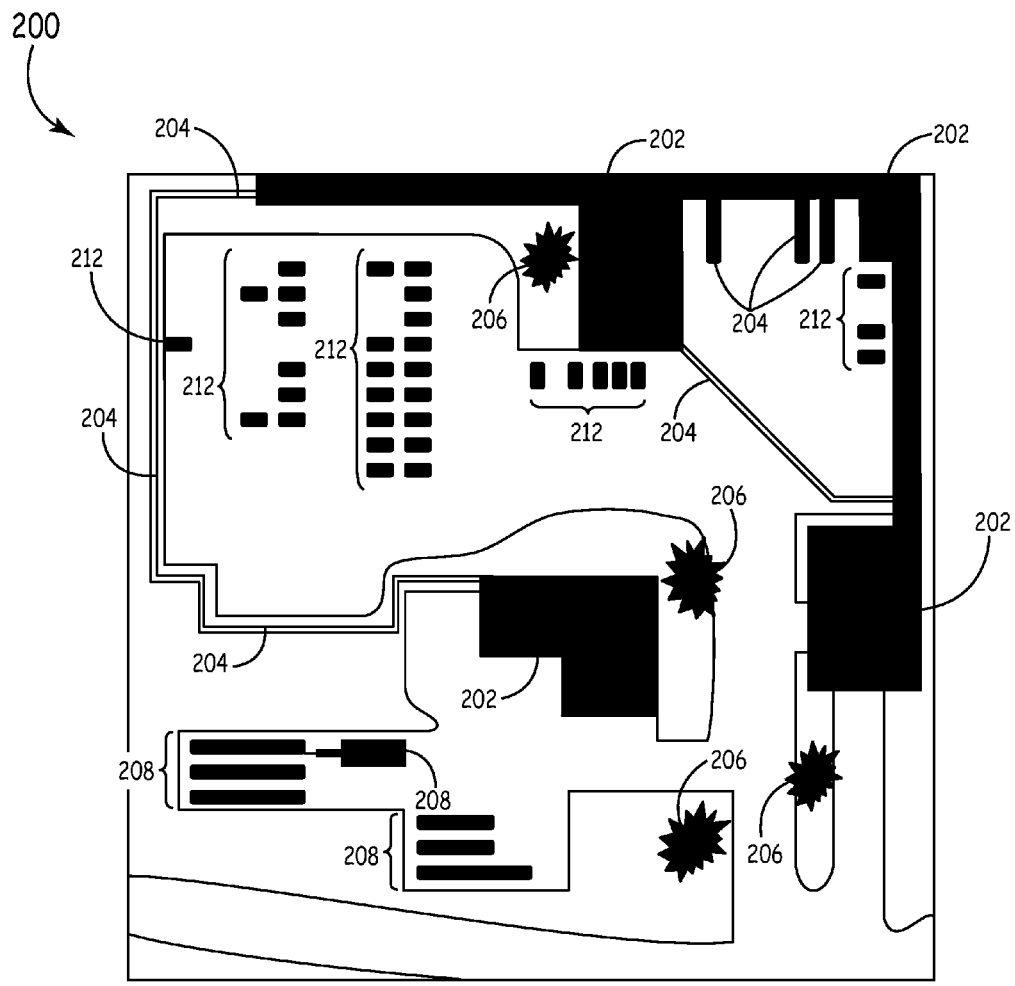
FIG. 2 is a top view of an exemplary environment in which the system of FIG. 1 operates.

FIG. 2 is a top view of an exemplary environment 200 in which navigation system 100A (or navigation system 100B) operates. The exemplary environment 200 shown in FIG. 2 includes a number of objects, including buildings 202, fences 204, trees 206, liquid reservoirs 208, semi-trailers 210, and ground vehicles 212. In exemplary embodiments, the buildings 202 are within a first height range, the fences 204 are within second height range, the trees 206 are within a third height range, the liquid reservoirs 208 are within a fourth height range, the semi-trailers 210 are within a fifth height range, and the ground vehicles 212 are within a sixth height range. In exemplary embodiments, the height of an object is associated with its static nature. For example, buildings 202 are likely to stay stationary from one time to another, while ground vehicles 212 are more likely to move from one time to another.

Figure 3A:
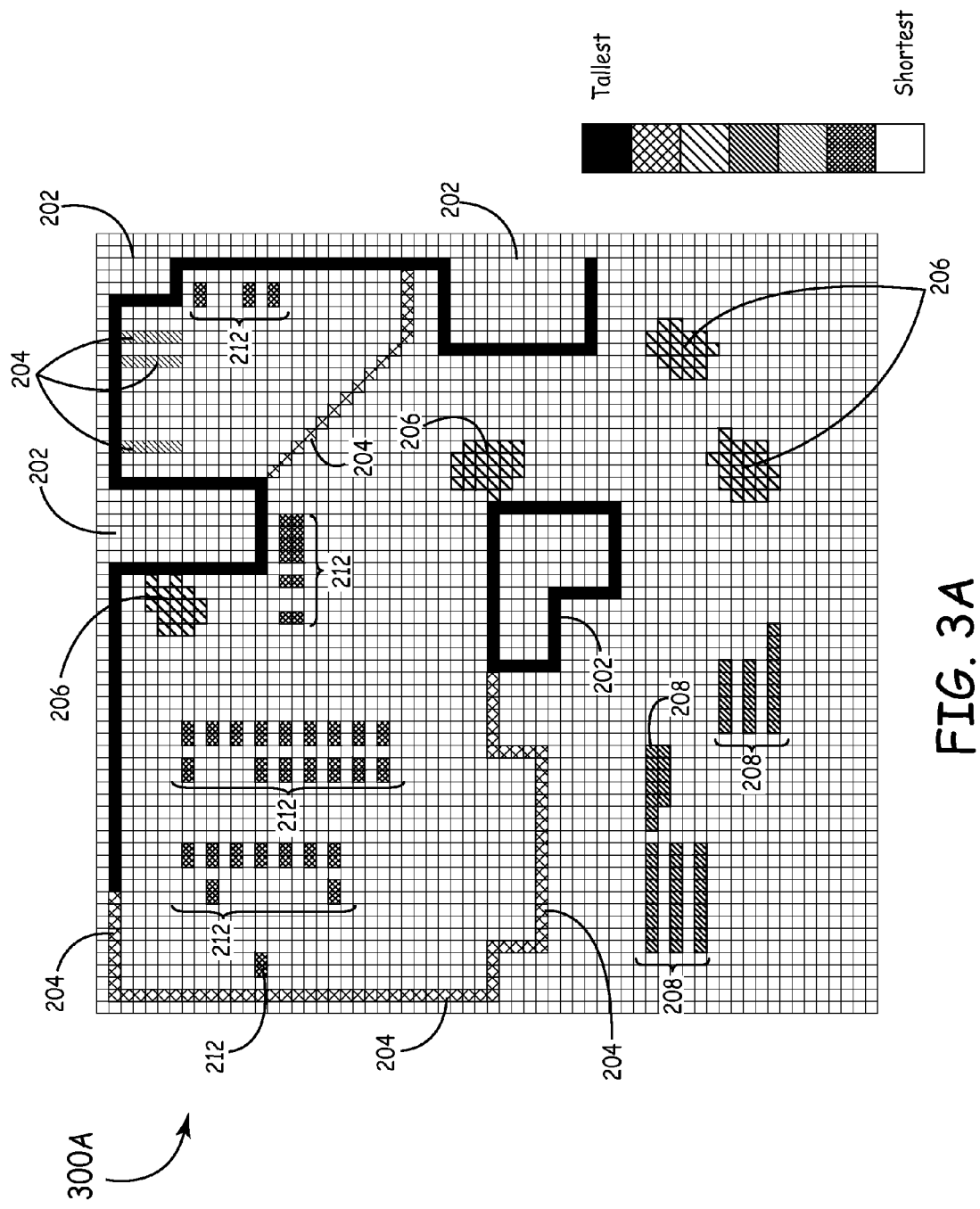
Figure 3B:
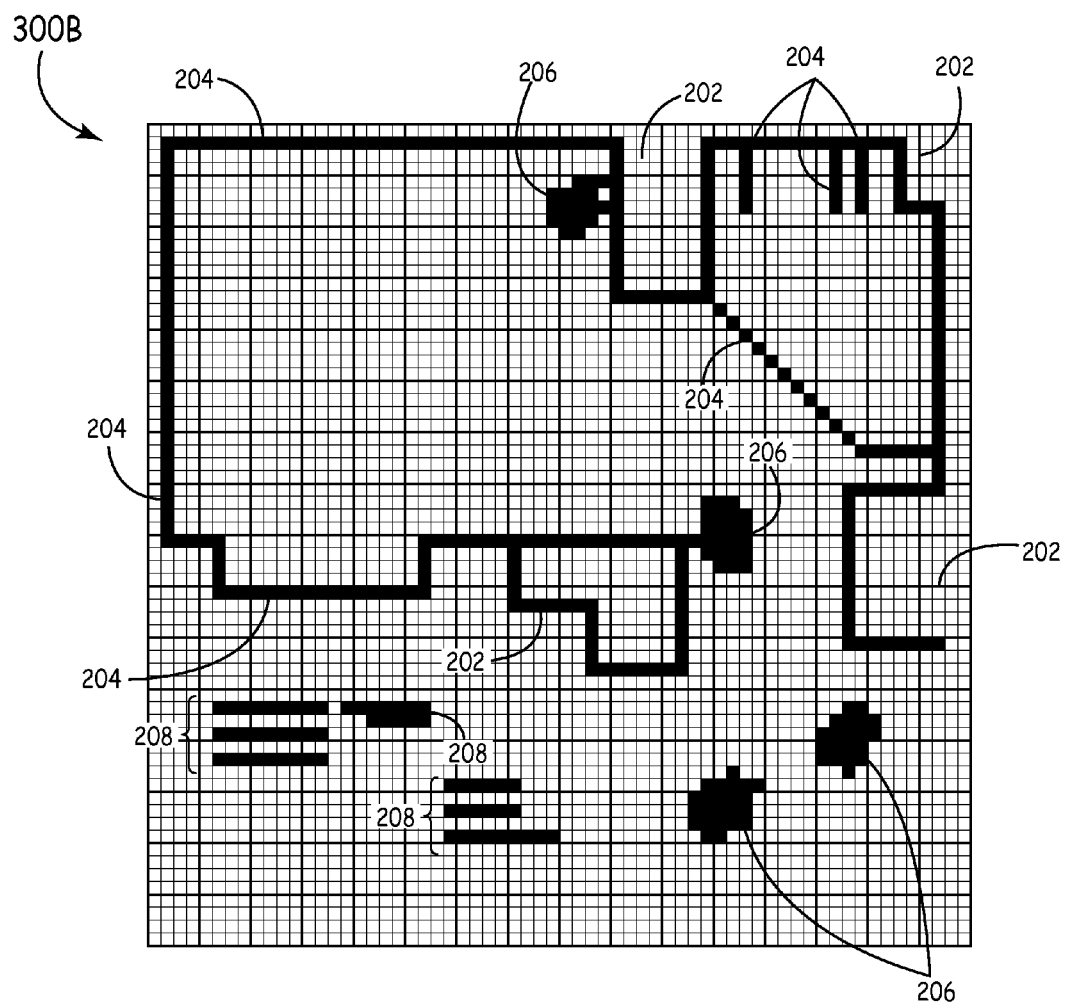

FIGS. 3A-3C are exemplary historical representations 300 of the environment 200 as generated by navigation system 100A (or navigation system 100B). Each of FIGS. 3A-3C illustrates a different representation 300 of the environment 200, labeled 300A-300C respectively.

FIG. 3A is a historical fine grid 300A representation of the environment 200 as generated by navigation system 100. The historical fine grid 300A of the environment 200 is divided into a plurality of (x,y) pixels having a single z value for height, such that z=height(x,y) at each pixel. Thus, the Z-dimension of the raw LIDAR return data is compressed down to a single value, simplifying subsequent manipulations and calculations. While the differences in height are represented by different hatching within each pixel in FIG. 3A, exemplary implementations use numbers. Specifically, in exemplary implementations, each pixel has an integer or decimal number indicating the height. In exemplar embodiments, there are a finite number of integer gradations for height and the scale of the gradations is based on the difference between the tallest objects and the ground in the environment 200. Thus, the scale may be set so each gradient represents a larger height if the tallest objects are mountains. In contrast, the scale may be set so each gradient represents a smaller height if the tallest objects in the environment 200 are buildings, such as in the exemplary embodiment of the environment 200 shown in FIG. 2.

In exemplary embodiments, the single Z-value is selected as the greatest Z-value, and thus the highest LIDAR return, at the particular (x,y) coordinates. In other exemplary embodiments, the single z value is an average of the Z-values at a particular (x,y) coordinate. In other exemplary embodiments, more than one Z-value is stored for each (x,y) coordinate, allowing for additional complexity of multiple levels in the historical fine grid 300A. Each multiple level increases the complexity of manipulation and calculations using the historical fine grid as described below. Specifically, in exemplary embodiments having two levels instead of just one, the correlation would take twice as long. Similarly, in exemplary embodiments having 5 levels instead of just one, the correlation would take five times as long.

In the exemplary embodiment shown in FIG. 3A, the environment 200 is 128 meters wide by 128 meters long and each pixel in the historical fine grid 300A is 2 meters wide by 2 meters long. In other exemplary embodiments, the environment and the pixels are different sizes and the ratio between them is different. For example, in an exemplary embodiment, the environment 200 is 250 meters wide by 250 long and each pixel in the historical fine grid 300A is 0.25 meters wide by 0.25 meters long. In another exemplary embodiment, the environment 200 is 2500 meters wide by 2500 meters long and each pixel in the historical fine grid 300A is 0.25 meters wide by 0.25 meters long. In another exemplary embodiment, the environment 200 is 1000 meters wide by 1000 meters long and each pixel in the historical fine grid 300A is 0.1 meters wide by 0.1 meters long.

In other embodiments, the size of the environment 200 is larger or smaller, the size of each pixel in the historical fine grid 300A is larger or smaller, and/or the ratio between the size of the environment and the size of each pixel is larger or smaller. As the factor between the size of the environment 200 and the size of each pixel in the historical fine grid 300A gets larger, the resolution increases. As the resolution increase, the computational complexity of correlating the historical fine grid 300A to a current fine grid representation also increases, thereby increasing the time required for correlation.

FIG. 3B is a historical fine edge 300B representation of the environment 200 generated from the historical fine grid 300A using an edge detection algorithm. Each shaded pixel identifies an edge. The processor 102 (or another processor in navigation system 100A) implements an edge detection algorithm on the historical fine grid 300A to determine where edges exist. These edges are represented in the historical fine edge 300B representation shown in FIG. 3B. In exemplary embodiments, an edge is identified when the pixel intensity representing the Z-value value between two adjacent pixels differs by more than a set threshold.

For example, if the threshold were set as two meters, then anywhere on the historical fine grid 300A where the Z-values of two adjacent pixels differed by more than two meters, an edge would be detected. Thus, the historical fine edge 300B representation of the environment shows edges at the boundaries between the buildings 202 and the ground, the fences 204 and the ground, the trees 206 and the ground, the liquid reservoirs 208, and the semi-trailers 210 because each of height differences between these elements and the ground exceeded the two meter threshold. In contrast, no edges are shown between the ground vehicles 212 and the ground because the height differences between the ground vehicles 212 and the ground do not exceed the two meter threshold.

The two meter threshold is merely exemplary and other embodiments use different thresholds. In some embodiments, it is desirable to reduce the amount of edges identified on objects that move and increase the amount of edges identified on stationary objects. In exemplary embodiments, the threshold is higher than two meters so that the semi-trailers 210 do not trigger edges. In exemplary embodiments, the threshold is set based on the height difference between the tallest objects and the ground in environment 200. Thus, the threshold for detection of an edge may be higher if there is a larger difference in height between the tallest objects and the ground in the environment 200.

Each pixel in the historical fine edge 300B representation of the environment 200 is part of a larger coarse pixel. In the exemplary embodiment shown in FIG. 3B, 16 historical fine edge 300B pixels are part of one historical coarse edge pixel.

FIG. 3C is a historical coarse edge count 300C representation of the environment 200 generated from the historical fine edge 300B by summing the quantity of fine pixels with edges in the historical fine edge 300B and putting the integer value representing the number of edges in the corresponding coarse pixel of the historical coarse edge count 300C representation. Thus, it can be seen that some of the coarse pixels of the historical coarse edge count 300C have zero in them, while others have other integers indicating how many fine pixels with edges were detected.

In exemplary embodiments, each of the historical fine grid 300A representation, the historical fine edge 300B representation, and the historical coarse edge count 300C representation may be generated by the navigation system 100 piecemeal at times when the navigation system 100 has GPS navigation and LIDAR returns. In exemplary embodiments, the system 100 is moved around the environment during times of GPS navigation to generate the historical fine grid 300A representation of the environment 200. In other exemplary embodiments, the historical fine grid 300A representation, the historical fine edge 300B representation, and the historical coarse edge count 300C are generated using other ranging means, such as by satellite. The integer values in the coarse pixels of the historical coarse edge count 300C representation form a distinctive pattern. In exemplary embodiments, the LIDAR location data generated by the system 100A (or system 100B) is used to reduce drift in the inertial sensors 108. In exemplary embodiments, the LIDAR location data generated by the system 100A (or system 100B) is used to reduce drift in the inertial sensors 108 when the GNSS receiver 110 does not have a signal. In exemplary embodiments, the LIDAR location data generated by the system 100A (or system 100B) is used to reduce drift in the inertial sensor 108 in systems where there is no GNSS receiver 110.

FIGS. 4A-4C are exemplary current representations 400 of a first current section of the environment 200 generated by navigation system 100A (or navigation system 100B). Each of FIGS. 4A-4C illustrates a different representation 400 of the first current section of the environment 200, labeled 400A-400C respectively.

FIG. 4A is a first current fine grid representation 400A representation of a first current section of the environment 200 as generated by navigation system 100. In the exemplary embodiment shown in FIG. 4A, the current fine grid representation 400A is centered about the LIDAR sensor 106 located at point 402. The current fine grid representation 400A of the environment is divided into a plurality of (x,y) pixels having a single z value for height, such that z=height (x,y) at each pixel. Thus, the Z-dimension of the raw LIDAR return data is compressed down to a single value, simplifying subsequent manipulations and calculations. In exemplary embodiments, the single Z-value is selected as the greatest Z-value, and thus the highest LIDAR return, at the particular (x,y) coordinates. In the other exemplary embodiments, the single Z-value is selected as an average of the Z-values at a particular (x,y) coordinate. In other exemplary embodiments, more than one Z-value is stored for each (x,y) coordinate, allowing for additional complexity of multiple levels in the current fine grid representation 400A. Each multiple level increases the complexity of manipulation and calculations using the historical fine grid as described below. In the exemplary embodiment shown in FIG. 4A, the first current section of the environment 200 is 64 meters wide and 64 meters long and each pixel in the current fine grid representation 400A is 2 meters wide by 2 meters long. In other exemplary embodiments, the environment and the pixels are different sizes and the ratio between them is different.

FIG. 4B is a first current fine edge 400B representation of a first current section of the environment 200 generated from the current fine grid representation 400A using an edge detection algorithm. Each shaded pixel identifies an edge. The processor 102 (or another processor in navigation system 100A) implements an edge detection algorithm on the current fine grid representation 400A to determine where edges exist. These edges are represented in the current fine edge 400B representation shown in FIG. 4B. In exemplary embodiments, an edge is identified where the pixel intensity representing the Z-value between two adjacent pixels differs by more than a set threshold. The threshold can be determined as described above with reference to the threshold in the historical fine edge 3B representation.

For example, if the threshold were set as two meters, then anywhere on the current fine grid representation 400A where the Z-values of two adjacent pixels differed by more than two meters, an edge would be detected. Thus, the current fine edge 400B representation of the environment shows edges at the boundaries between the buildings 202 and the ground, the fences 204 and the ground, the trees 206 and the ground, the liquid reservoirs 208, and the semi-trailers 210 because each of the height differences between these elements and the adjacent ground exceeded the two meter threshold. In contrast, no edges are shown between the ground vehicles 212 and the ground because the height differences between the ground vehicles 212 and the ground do not exceed the two meter threshold. The two meter threshold is merely exemplary and other embodiments use different thresholds. In exemplary embodiments, the threshold is higher than two meters so that the semi-trailers 210 do not trigger edges. In some embodiments, it is desirable to reduce the amount of edges identified on objects that move and increase the amount of edges identified on stationary objects.

Each pixel in the current fine edge 400B representation of the environment 200 is part of a larger coarse pixel. In the exemplary embodiment shown in FIG. 4B, 16 current fine edge 400B pixels are part of one current coarse edge pixel.

FIG. 4C is a current coarse edge count representation 400C representation of the environment 200 generated from the current fine edge 400B by summing the quantity of fine pixels with edges in the current fine edge 400B and putting the integer value representing the number of edges in the corresponding coarse pixel of the current coarse edge count representation 400C representation. Thus, it can be seen that some of the coarse pixels of the current coarse edge count representation 400C have zero in them, while others have other integers.

The current coarse edge count representation 400C is correlated with the historical coarse edge count 300C by the processor 102 to determine which section of the environment 200 the navigation system 100 is currently in. This correlation is described in detail with reference to FIGS. 5A-5C.

Figure 5A:
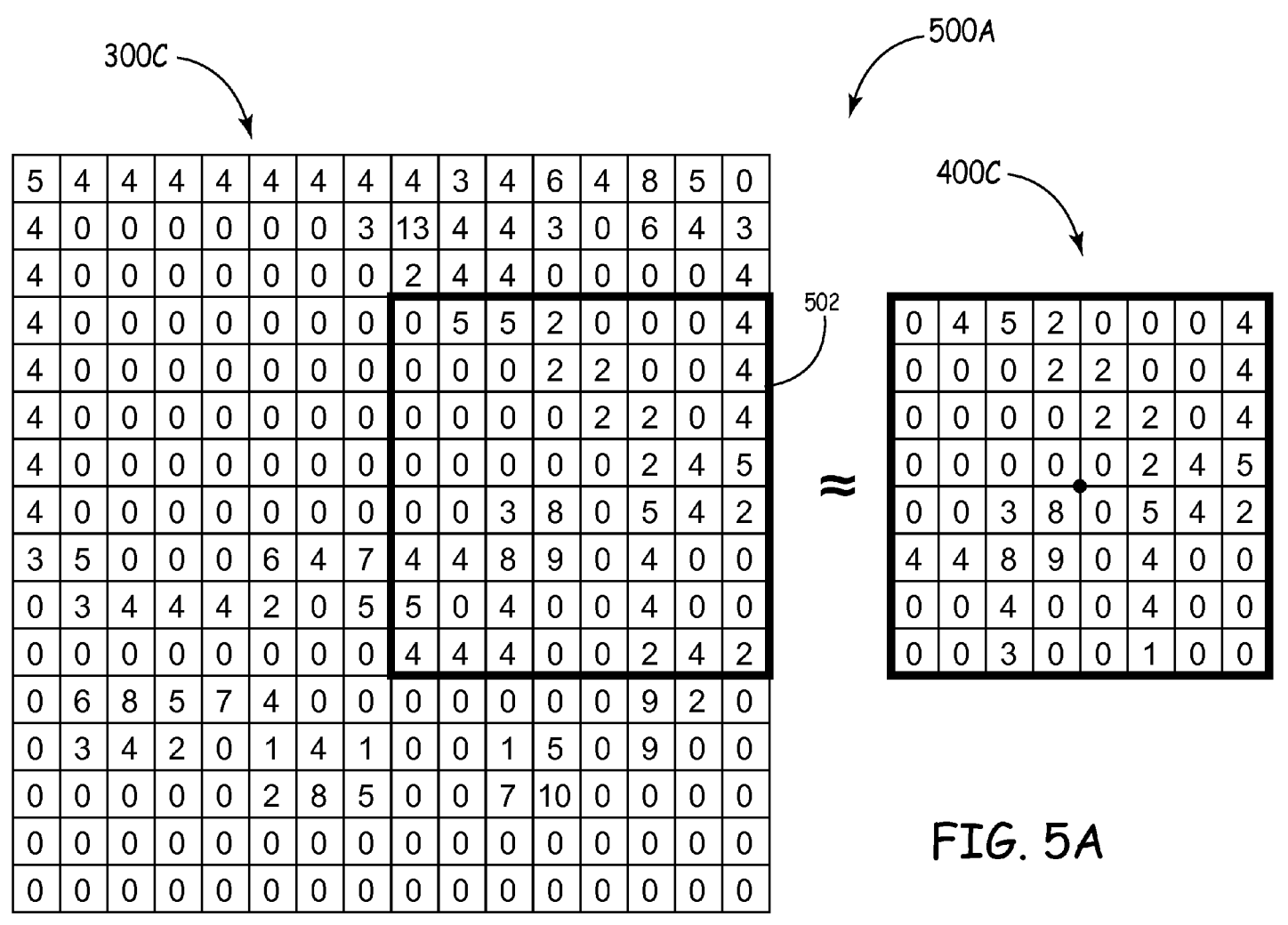
Figure 5B:
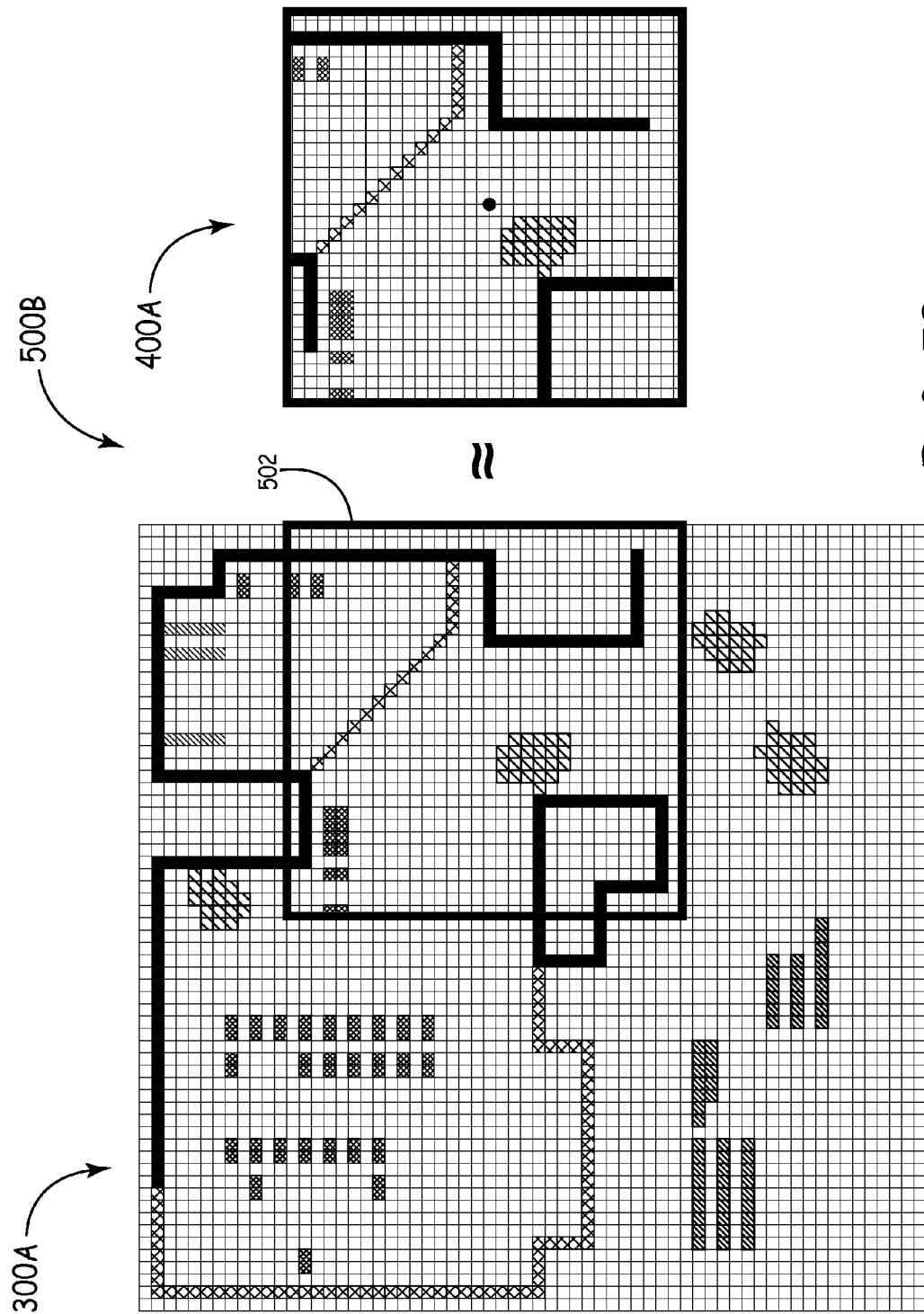
Figure 5C:
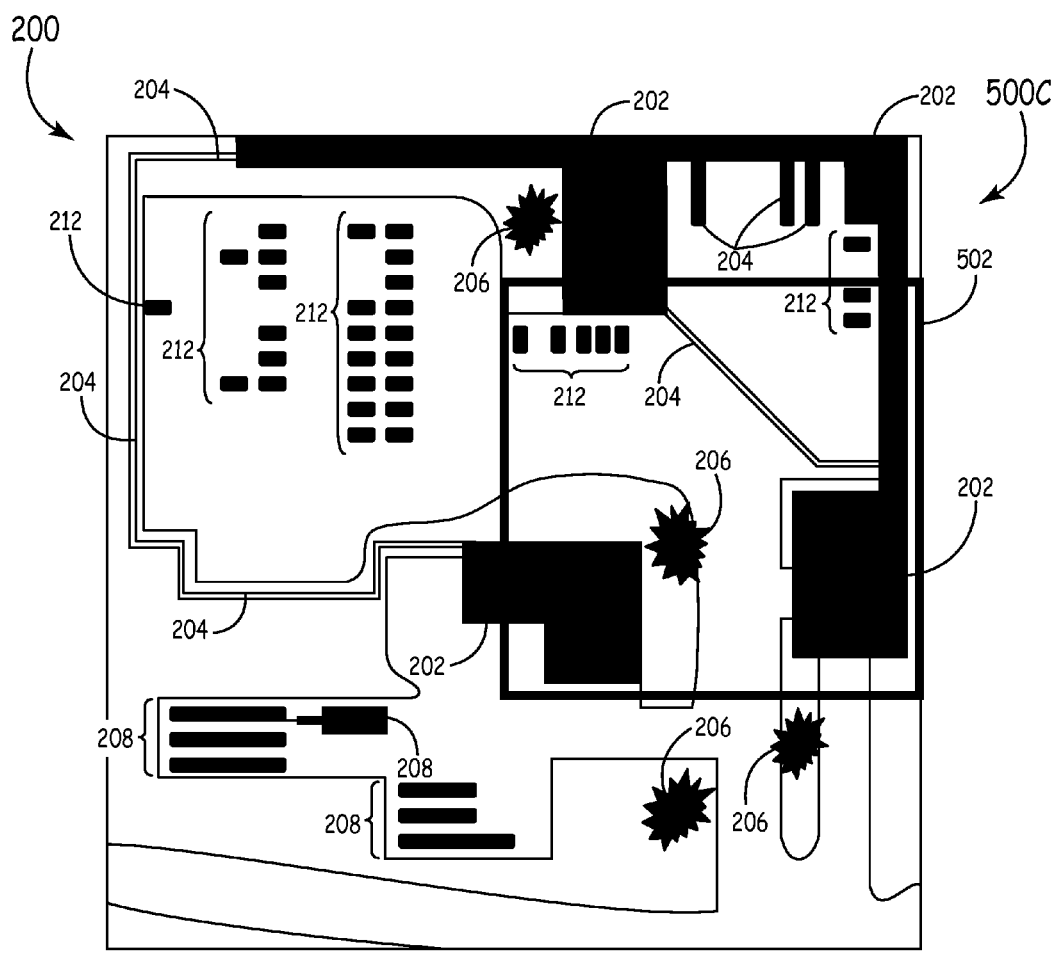

FIGS. 5A-5C are exemplary representations 500 of the results of the correlation between the current coarse edge count representation 400C and the historical coarse edge count 300C as performed by the processor 102. Each of FIGS. 5A-5C illustrates a different representation 500 of the results, labeled 500A-500C respectively.

FIG. 5A shows the correlation results of the current coarse edge count representation 400C of the subsection 502 of the environment 200 with the historical coarse edge count 300C of the environment 200. On the left side of FIG. 5A, the historical coarse edge count 300C is shown. On the right side of FIG. 5A, the current coarse edge count representation 400C is shown. The subsection 502 of the entire historical coarse edge count 300C that is highlighted with the square has the highest correlation with the current coarse edge count representation 400C shown on the right side of FIG. 5A.

In exemplary embodiments, a two sided correlation is used, where both (1) the presence of edge pixels in the current coarse edge count representation 400C that are not in the area of the historical coarse edge count 300C being correlated; and (2) the presence of edge pixels in the area of the historical coarse edge count 300C being correlated that are not in the current coarse edge count representation 400C work to reduce the correlation between the current coarse edge count representation 400C and the area of the historical coarse edge count 300C being correlated. Two sided correlation is described in more detail below with reference to FIGS. 12A-12B.

In the exemplary embodiment shown in FIG. 5A, the subsection 502 of the entire historical coarse edge count 300C has a correlation of approximately 0.89 with the current coarse edge count representation 400C. Thus, in the exemplary embodiment shown, there is not an exact match between the subsection 502 and the current coarse edge count representation 400C. In the exemplary embodiments shown, this is because the LIDAR, when first initialized to obtain the current location, did not have edge data regarding all of the places that the historical coarse edge count 300C had edge data. Specifically, there were some areas of the area represented in the current coarse edge count representation 400C that were shadowed by objects, such as buildings 202, fences 204, trees 206, etc. In exemplary embodiments, noise and errors in the raw data can also cause the correlation to not be an exact match. In the exemplary embodiments shown, it is not necessary that the correlation be an exact match, merely that the highest correlation be used to determine the current location.

In exemplary embodiments, a one sided correlation is used instead of a two sided correlation. In a one sided correlation, only the presence of edge pixels in the current coarse edge count representation 400C that are not in the area of the historical coarse edge count 300C being correlated work to reduce the correlation between the current coarse edge count representation 400C and the area of the historical coarse edge count 300C being correlated. The presence of edge pixels in the area of the historical coarse edge count 300C being correlated do not work to reduce the correlation between the current coarse edge count representation 400C and the area of the historical coarse edge count 300C being correlated. One sided correlation is described in more detail below with reference to FIGS. 12A-12B.

In exemplary embodiments, the correlation is performed by sliding the current coarse edge count representation 400C across the historical coarse edge count 300C so that a correlation can be performed for each (x,y) combination. In exemplary embodiments having multiple Z levels in either the current coarse edge count representation 400C or the historical coarse edge count 300C, the correlation will have to be performed for each (x,y) combination in each Z level.

In exemplary embodiments, it is not necessary to perform the correlation through all degrees of rotation because the navigation system 100 has information from the inertial sensors 108, the GNSS receiver 110, or other aiding sources 112 (such as a magnetic compass) to know what the current orientation of the system was at a particular time and to be able compensate for any differences in the reference frame orientation of the current coarse edge count representation 400C and the reference from orientation of the historical coarse edge count 300C.

FIG. 5B shows the location of the subsection 502 within the environment 200 on the historical fine grid 300A based on the correlation results of FIG. 5A. On the left side of FIG. 5B, the historical fine grid 300A is shown. On the right side of FIG. 5B, the current fine grid representation 400A is shown. The subsection 502 of the historical fine grid 300A that is highlighted with the square is selected based on the correlation described above. In exemplary embodiments, a second correlation is performed by the processor 102 between the current fine grid representation 400A and the subsection 502 of the historical fine grid 300A to determine the precise location of the navigation system 100 within the subsection 502 of the historical fine grid 300A.

FIG. 5C shows the location of the subsection 502 within the environment 200 on the top view of the exemplary environment 200 in which navigation system 100A (or navigation system 100B) operates. The subsection 502 of the environment 200 is that is highlighted with the square is selected based on the correlation described above. As described above, in exemplary embodiments, a second correlation is performed by the processor 102 between the current fine grid representation 400A and the subsection 502 of the historical fine grid to determine the precise location of the navigation system 100 within the subsection 502 of the historical fine grid.

Figures 6A, 6B, 6C:
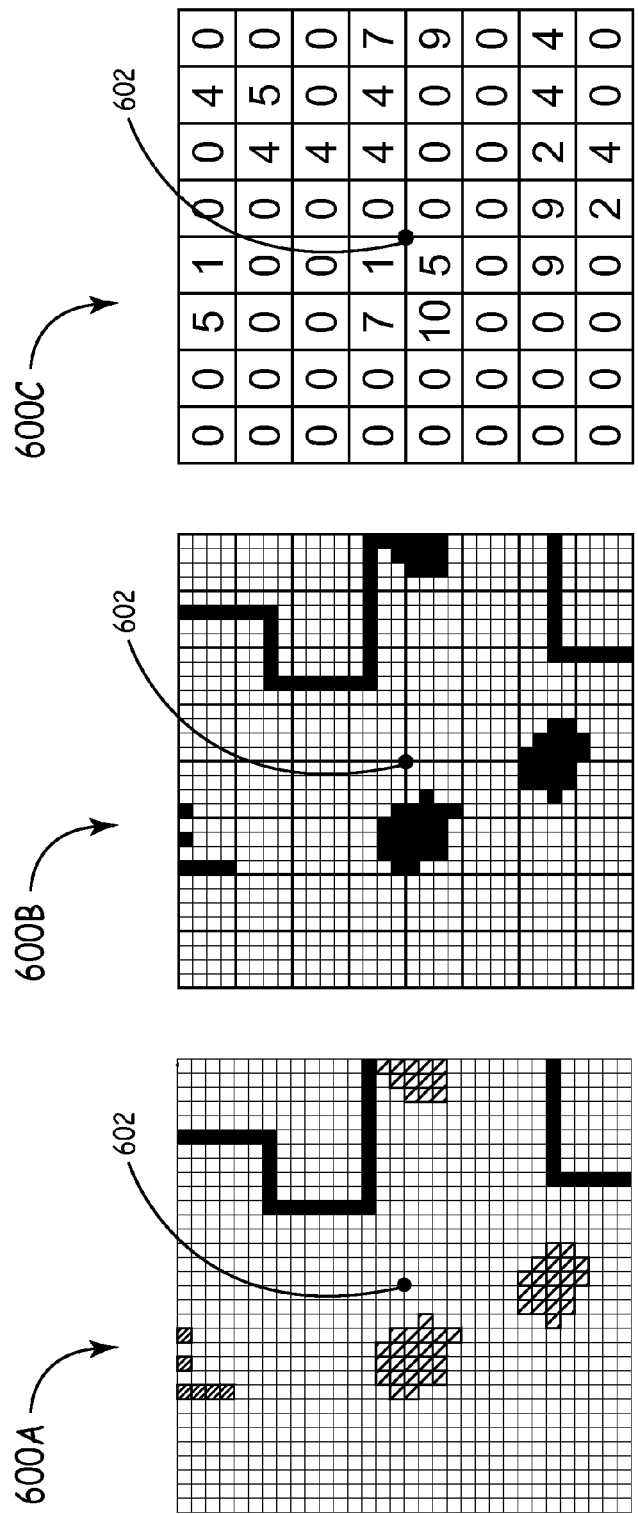
FIGS. 6A-6C are exemplary representations of a second current section of the environment of FIG. 2.

FIG. 6A-6C are exemplary current representations 600 of a second current section of the environment 200 generated by navigation system 100A (or navigation system 100B). Each of FIGS. 6A-6C illustrates a different representation 600 of the second current section of the environment 200, labeled 600A-600C respectively.

FIG. 6A is a second current fine grid representation 600A representation of a second current section of the environment 200 as generated by navigation system 100. In the exemplary embodiment shown in FIG. 6A, the current fine grid representation 600A representation is centered about the LIDAR sensor 106 located at point 602. The current fine grid representation 600A of the environment is divided into a plurality of (x,y,) pixels having a single z value for height, such that z=height(x,y) at each pixel. Thus, the Z-dimension of the raw LIDAR return data is compressed down to a single value, simplifying subsequent manipulations and calculations. In exemplary embodiments, the single Z-value is the selected as the greatest Z-value, and thus the highest LIDAR return, at the particular (x,y) coordinates. In the other exemplary embodiments, the single Z-value is an average of the Z-values at a particular (x,y) coordinate. In other embodiments, more than one Z-value is stored for each (x,y) coordinate, allowing for additional complexity of multiple levels in the current fine grid representation 600A. Each multiple level increases the complexity of manipulation and calculations using the historical fine grid as described below. In the exemplary embodiment shown in FIG. 6A, the second current section of the environment 200 is 64 meters wide and 64 meters long and each pixel in the current fine grid representation 600A is 2 meters wide by 2 meters long. In other exemplary embodiments, the environment and the pixels are different sizes and the ratio between them is different.

FIG. 6B is a second current fine edge 600B representation of the second current section of the environment 200 generated from the second current fine grid representation 600A using an edge detection algorithm. Each shaded pixel identifies an edge. The processor 102 (or another processor in navigation system 100A) implements an edge detection algorithm on the second current fine grid representation 600A to determine where edges exist. These edges are represented in the second current fine edge 600B representation shown in FIG. 6B. In exemplary embodiments, an edge is identified where the pixel intensity representing the Z-value between two adjacent pixels differs by more than a set threshold. The threshold can be determined as described above with reference to the threshold in the historical fine edge 3B representation.

For example, if the threshold were set as two meters, then anywhere on the second current fine grid representation 600A where the Z-values of two adjacent pixels differed by more than two meters, an edge would be detected. Thus, the second current fine edge 600B representation of the environment shows edges at the boundaries between the buildings 202 and the ground, the fences 204 and the ground, the trees 206 and the ground, the liquid reservoirs 208, and the semi-trailers 210 because each of height differences between these elements and the ground exceeded the two meter threshold. In contrast, no edges are shown between the ground vehicles 212 and the ground because the height differences between the ground vehicles 212 and the ground do not exceed the two meter threshold. The two meter threshold is merely exemplary and other embodiments use different thresholds. In exemplary embodiments, the threshold is higher than two meters so that the semi-trailers 210 do not trigger edges. In some embodiments, it is desirable to reduce the amount of edges identified on objects that move and increase the amount of edges identified on stationary objects.

Each pixel in the second current fine edge 600B representation of the environment 200 is part of a larger coarse pixel. In the exemplary embodiment shown in FIG. 6B, 16 current fine edge 600B pixels are part of one current coarse edge pixel.

FIG. 6C is a second current coarse edge count representation 600C representation of the section current section of the environment 200 generated from the second current fine edge 600B by summing the quantity of fine pixels with edges in the second current fine edge 600B and putting the integer value representing the number of edges in the corresponding coarse pixel of the second current coarse edge count representation 600C representation. Thus, it can be seen that some of the coarse pixels of the second current coarse edge count representation 600C have zero in them, while others have other integers.

The current coarse edge count representation 600C is correlated with the historical coarse edge count 300C by the processor 102 to determine which section of the environment 200 the navigation system 100 is currently in. This correlation is described in detail with reference to FIGS. 7A-7C.

Figure 7B:
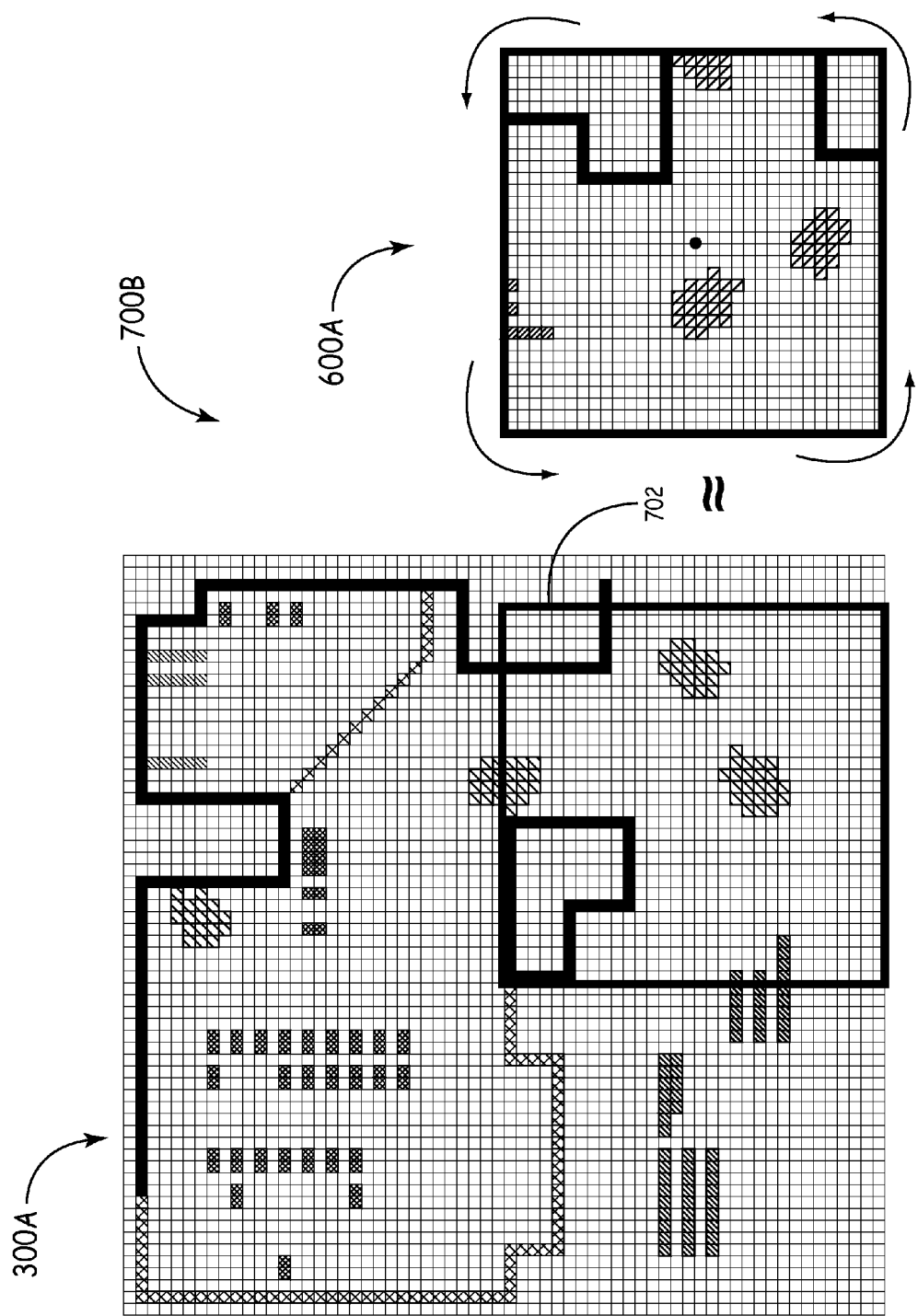
Figure 7C:
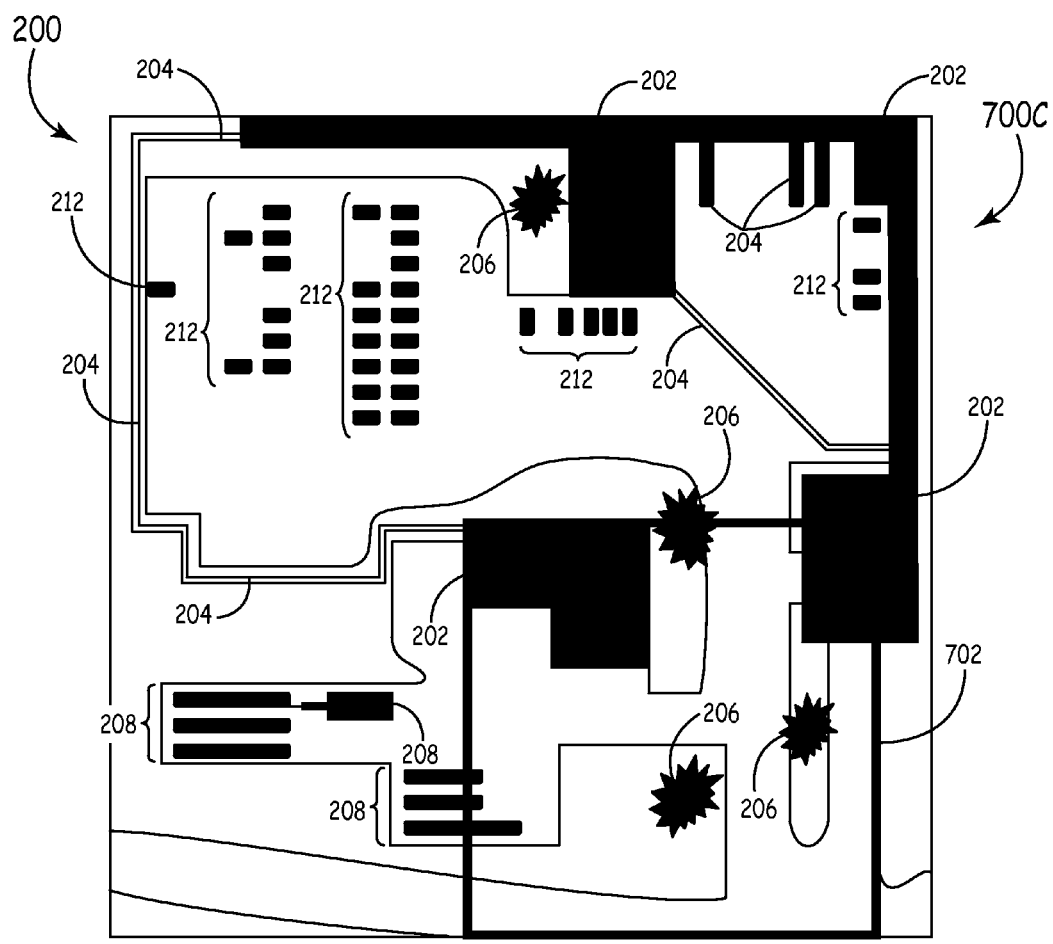

FIGS. 7A-7C are exemplary representations 500 of the results of the correlation between the second current coarse edge count representation 600C and the historical coarse edge count 300C as performed by the processor 102. Each of FIGS. 7A-7C illustrates a different representation 700 of the results, labeled 700A-700C respectively.

FIG. 7A shows the correlation results of the current coarse edge count representation 600C of the subsection 702 of the environment 200 with the historical coarse edge count 300C of the environment 200. On the left side of FIG. 7A, the historical coarse edge count 300C is shown. On the right side of FIG. 7A, the current coarse edge count representation 600C is shown. The subsection 702 of the entire historical coarse edge count 300C that is highlighted with the square has the highest correlation with the rotated current coarse edge count representation 600C shown on the right side of FIG. 7A. In the exemplary embodiment shown in FIG. 5A, the subsection 502 of the entire historical coarse edge count 300C has a correlation of approximately 0.92 with the current coarse edge count representation 400C. Thus, the exemplary embodiment shown, there is not an exact match between the subsection 702 and the current coarse edge count representation 600C. In the exemplary embodiments shown, this is because the LIDAR sensor 106, when first initialized to obtain the current location, did not have edge data regarding all of the places that the historical coarse edge count 300C had edge data. Specifically, there were some areas of the area represented in the second current coarse edge count representation 600C that were shadowed by objects, such as buildings 202, fences 204, trees 206, etc. In exemplary embodiments, noise and errors in the raw data can also cause the correlation to not be an exact match. In the exemplary embodiments shown, it is not necessary that the correlation be an exact match, merely that the highest correlation be used to determine the current location.

In exemplary embodiments, a two sided correlation is used, where both (1) the presence of edge pixels in the current coarse edge count representation 600C that are not in the area of the historical coarse edge count 300C being correlated; and (2) the presence of edge pixels in the area of the historical coarse edge count 300C being correlated that are not in the current coarse edge count representation 600C work to reduce the correlation between the current coarse edge count representation 600C and the area of the historical coarse edge count 300C being correlated. Two sided correlation is described in more detail below with reference to FIGS. 12A-12B.

In exemplary embodiments, a one sided correlation is used instead of a two sided correlation. In a one sided correlation, only the presence of edge pixels in the current coarse edge count representation 600C that are not in the area of the historical coarse edge count 300C being correlated work to reduce the correlation between the current coarse edge count representation 600C and the area of the historical coarse edge count 300C being correlated. The presence of edge pixels in the area of the historical coarse edge count 300C being correlated do not work to reduce the correlation between the current coarse edge count representation 600C and the area of the historical coarse edge count 300C being correlated. One sided correlation is described in more detail below with reference to FIGS. 12A-12B.

In exemplary embodiments, the correlation is performed by sliding the current coarse edge count representation 600C across the historical coarse edge count 300C so that a correlation can be performed for each (x,y) combination. In exemplary embodiments having multiple Z levels in either the current coarse edge count representation 600C or the historical coarse edge count 300C, the correlation will have to be performed for each (x,y) combination in each Z level.

In exemplary embodiments, the correlation is performed by rotating the current coarse edge count representation 600C around at each (x,y) combination. In exemplary embodiments, the current coarse edge count representation 600C is rotated 360 degrees in one degree increments for each (x,y) combination and a correlation is performed for each degree of rotation. In other exemplary embodiments, the current coarse edge count representation 600C is rotated at different increments to obtain different resolutions of accuracy.

In the exemplary embodiment shown in FIG. 7A, the current coarse edge count representation 600C had the highest correlation when it was rotated 90 degrees counterclockwise. While the rotation increases the time required for computation, it is used in exemplary embodiments where the navigation system 100 does not accurately know the current orientation of the system to compensate for any differences in the reference frame orientation of the current coarse edge count representation 600C and the reference from orientation of the historical coarse edge count 300C.

FIG. 7B shows the location of the subsection 702 within the environment 200 on the historical fine grid 300A based on the correlation results of FIG. 7A. On the left side of FIG. 7B, the historical fine grid 300A is shown. On the right side of FIG. 7B, the second current fine grid representation 600A is shown. The subsection 702 of the historical fine grid 300A that is highlighted with the square is selected based on the correlation described above. The correlation also determines the necessary rotation between the subsection 702 of the historical fine grid 300A and the current fine grid representation 600A. In exemplary embodiments, a second correlation is performed by the processor 102 between the current fine grid representation 600A and the subsection 702 of the historical fine grid to determine the precise location of the navigation system 100 within the subsection 702 of the historical fine grid. In exemplary embodiments, the second correlation also uses rotation to find the highest correlation.

FIG. 7C shows the location of the subsection 702 within the environment 200 on the top view of the exemplary environment 200 in which navigation system 100A (or navigation system 100B) operates. The subsection 702 of the environment 200 that is highlighted with the square is selected based on the correlation described above. As described above, in exemplary embodiments, a second correlation is performed by the processor 102 between the current fine grid representation 600A and the subsection 702 of the historical fine grid to determine the precise location of the navigation system 100 within the subsection 502 of the historical fine grid.

Figure 8A:
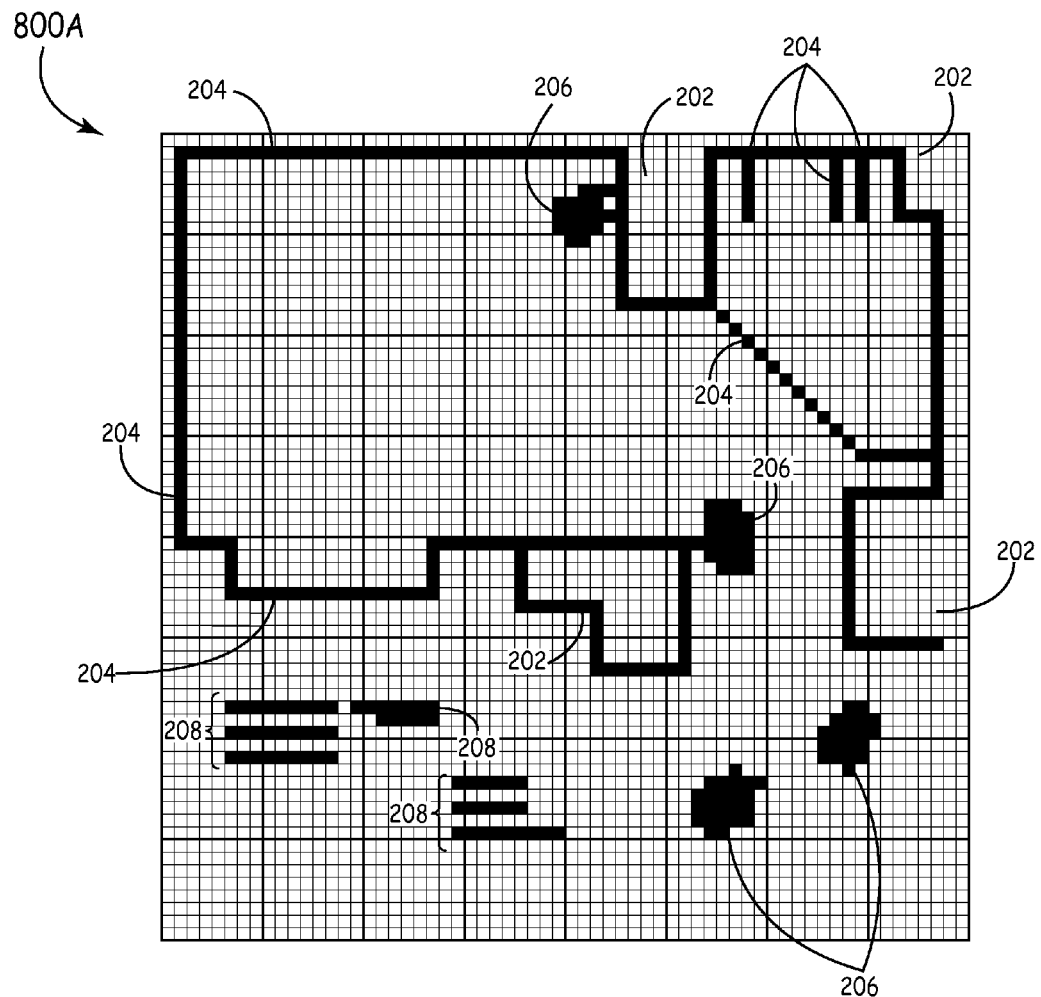
FIGS. 8A-8B are exemplary historical representations of the environment of FIG. 2 as generated by the system of FIG. 1.
Figure 8B:

FIGS. 8A-8B are exemplary historical representations 800 of the environment 200 as generated by navigation system 100A (or navigation system 100C). Each of FIGS. 8A-8B illustrates a different representation 800 of the environment 200, labeled 800A-800B respectively.

FIG. 8A is a historical fine edge 800A representation of the environment 200 generated from the historical fine grid 300A using an edge detection algorithm. The historical fine edge 800A representation is the same as historical fine edge 300B representation, with the exception of the quantity of fine edge pixels within each coarse edge pixel and the size of the coarse pixels. Each pixel in the historical fine edge 800A representation of the environment 200 is part of a larger coarse pixel. In the exemplary embodiment shown in FIG. 8A, 64 historical fine edge 800A pixels are part of one historical coarse edge pixel.

FIG. 8B is a historical coarse edge count 800B representation of the environment 200 generated from the historical fine edge 800A by summing the quantity of fine pixels with edges in the historical fine edge 800A and putting the integer value representing the number of edges in the corresponding coarse pixel of the historical coarse edge count 800B representation. Thus, it can be seen that some of the coarse pixels of the historical coarse edge count 800B have zero in them, while others have other integers indicating how many fine pixels with edges were detected.

In exemplary embodiments, each of the historical fine grid 300A representation, the historical fine edge 800A representation, and the historical coarse edge count 800B representation may be generated by the navigation system 100 piecemeal at times when the navigation system 100 has GPS navigation and LIDAR returns. In other exemplary embodiments, the historical fine grid 300A representation, the historical fine edge 800A representation, and the historical coarse edge count 800B are generated using other ranging means, such as by satellite. The integer values in the coarse pixels of the historical coarse edge count 300C representation form a distinctive pattern.

Figures 9A, 9B, 9C:
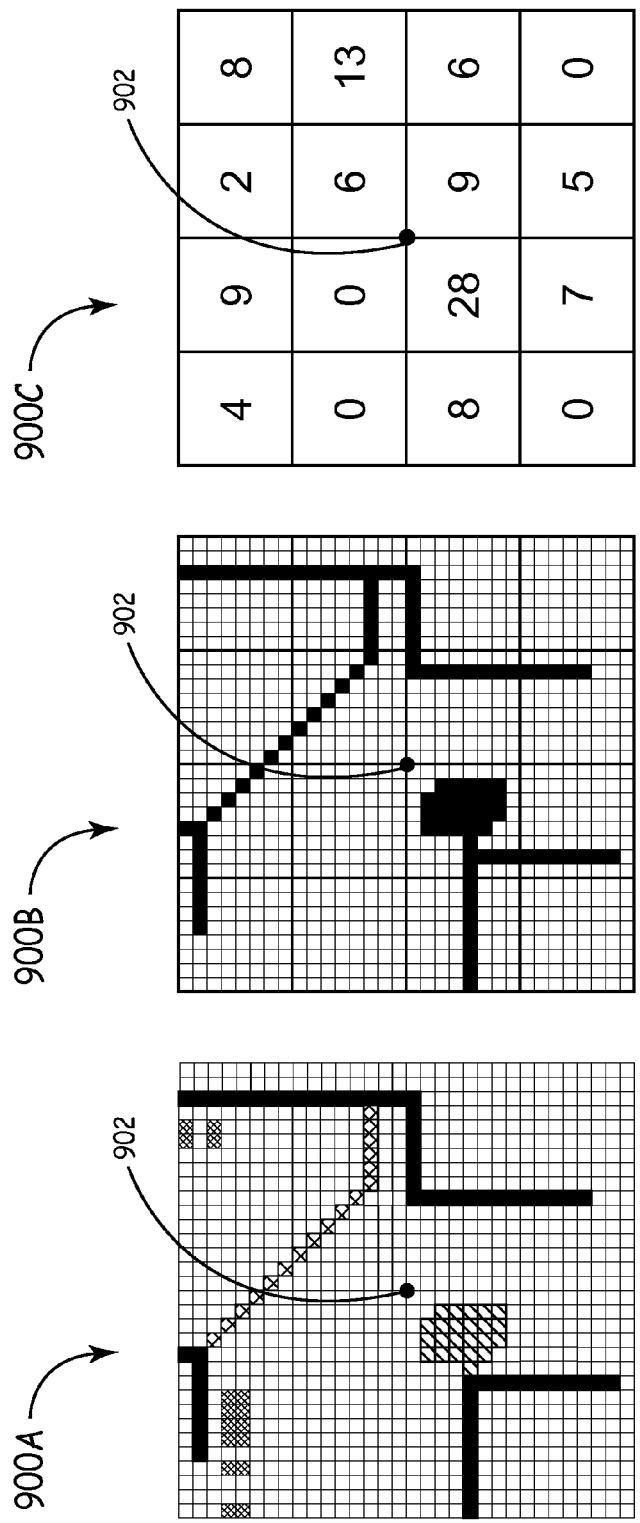
FIGS. 9A-9C are exemplary representations of the first current section of the environment of FIG. 2 using a more coarse grid than the exemplary representations shown in FIGS. 4A-4C.

FIG. 9A-9C are exemplary current representations 900 of the first current section of the environment 200 generated by navigation system 100A (or navigation system 100B). Each of FIGS. 9A-9C illustrates a different representation 900 of the first current section of the environment 200, labeled 900A-900C respectively.

FIG. 9A is a third current fine grid representation 900A representation of the first current section of the environment 200 as generated by navigation system 100. The current fine grid representation 900A representation is the same as current fine grid representation 400A representation. In the exemplary embodiment shown in FIG. 9A, the current fine grid representation 900A is centered about the LIDAR sensor 106 located at point 902.

FIG. 9B is a third current fine edge 900B representation of the first current section of the environment 200 as generated by navigation system 100. The current fine edge 900B representation is the same as the current fine edge 400B representation, with the exception of the quantity of fine edge pixels within each coarse edge pixel and the size of the coarse pixels. Each pixel in the third current fine edge 900B of the first current section of the environment 200 is part of a larger coarse pixel. In the exemplary embodiment shown in FIG. 6B, 64 third current fine edge 900B pixels are part of one historical coarse edge pixel.

FIG. 9C is a third current coarse edge count representation 900C representation of the first current section of the environment 200 generated from the third current fine edge 900B by summing the quantity of fine pixels with edges in the third current fine edge 900B and putting the integer value representing the number of edges in the corresponding coarse pixel of the coarse edge count 900C have zero in them, while others have other integers indicating how many fine pixels with edges were detected.

In exemplary embodiments, each of the third current fine grid representation 900A representation, the third current fine edge 900B representation, and the third current coarse edge count representation 900C representation may be generated by the navigation system 100 piecemeal at times when the navigation system 100 has GPS navigation and LIDAR returns. In other exemplary embodiments, the third current fine grid representation 900A representation, the third current fine edge 900B representation, and the third current coarse edge count representation 900C representation are generated using other ranging means, such as by satellite. The integer values in the coarse pixels of the third current coarse edge count representation 900C representations form a distinctive pattern.

Figure 10A:
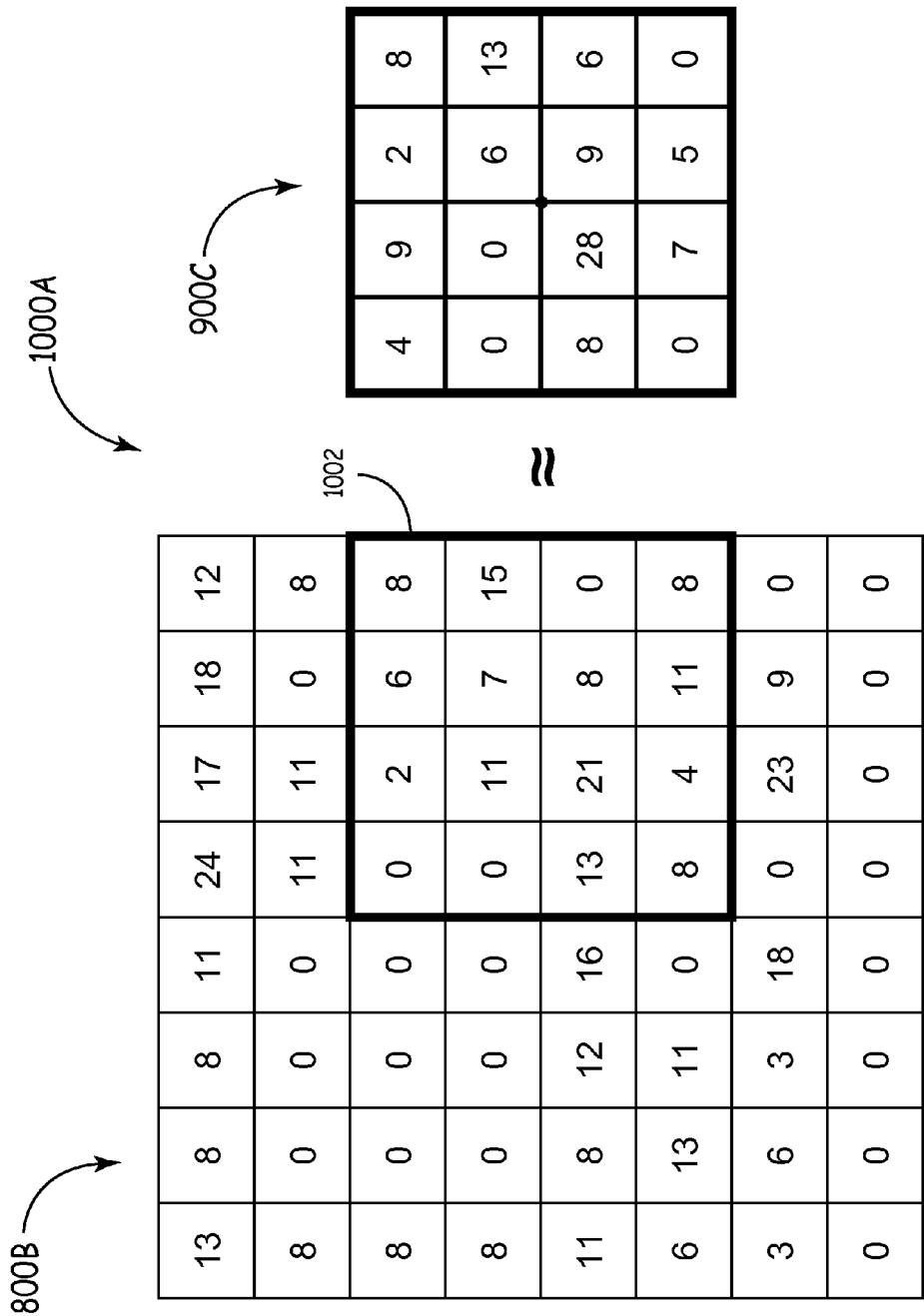
FIGS. 10A-10C are exemplary representations of the results of a correlation between a third current coarse edge count representation of the first current section and a historical coarse edge count representation of the environment of FIG. 2.
Figure 10B:
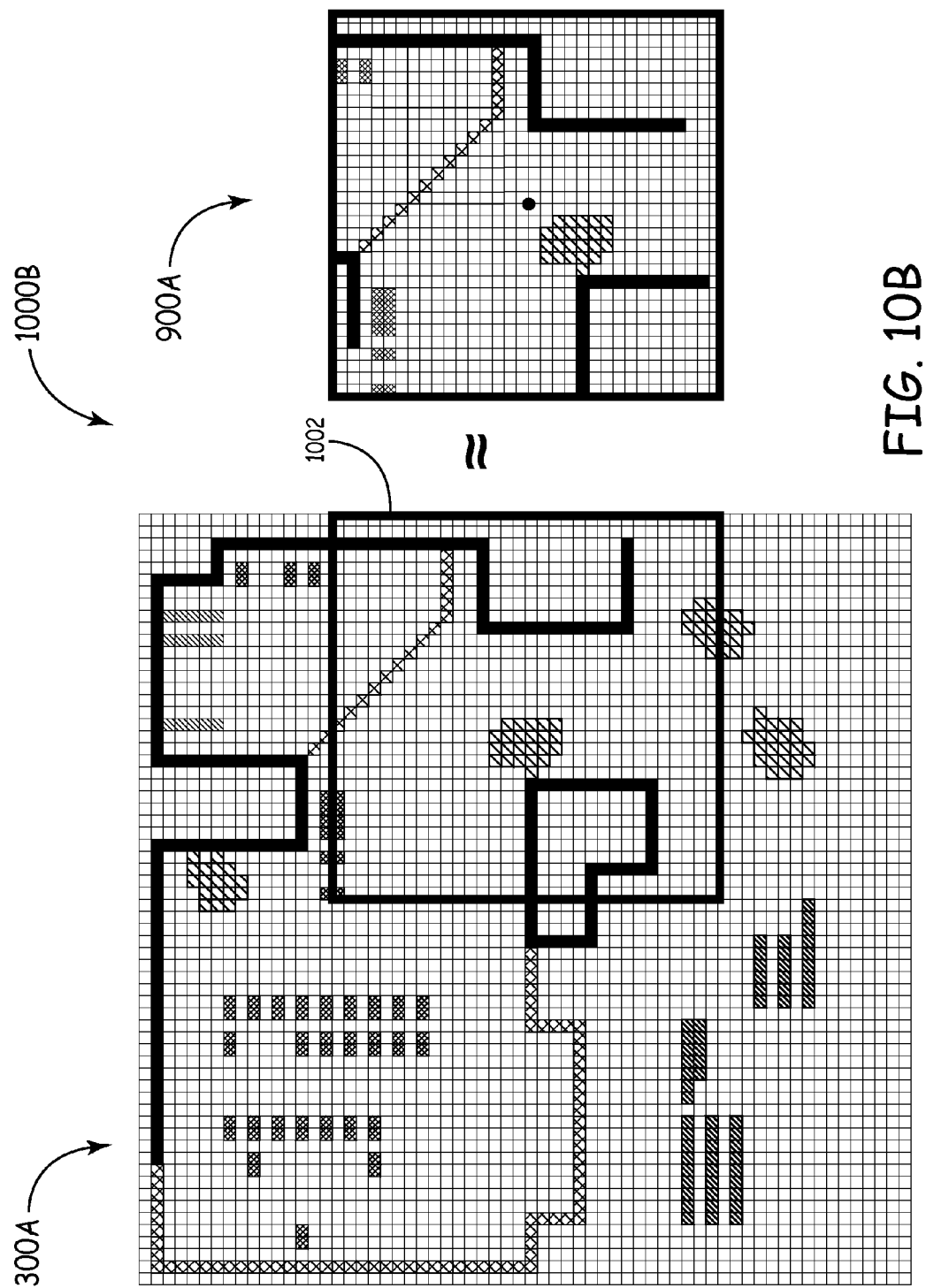
Figure 10C:
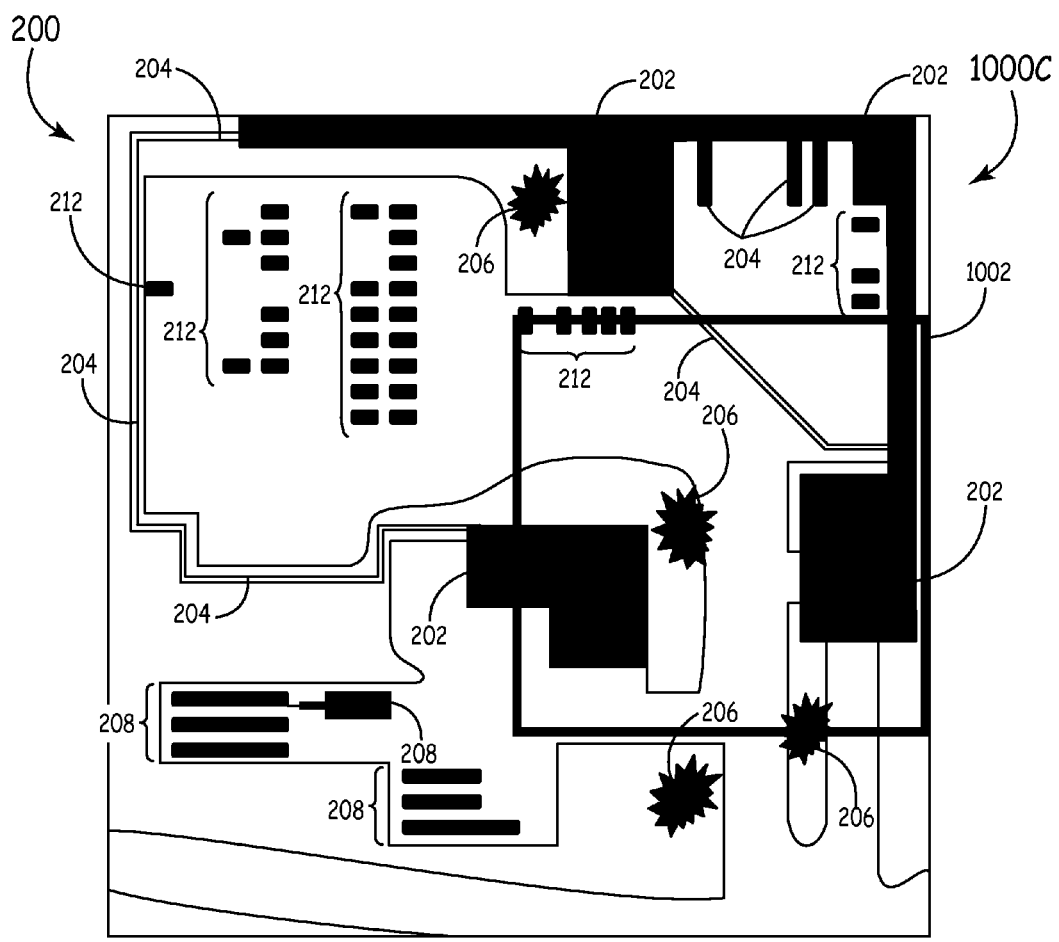

FIGS. 10A-10C are exemplary representations 1000 of the results of the correlation between the third current coarse edge count representation 900C and the historical coarse edge count 800B as performed by the processor 102. Each of FIGS. 10A-10C illustrates a different representation 1000 of the results, labeled 1000A-1000C respectively.

FIG. 10A shows the correlation results of the third current coarse edge count representation 900C of the first current section of the environment 200 with the historical coarse edge count 800B of the environment 200. On the left side of FIG. 10A, the historical coarse edge count 800B is shown. The subsection 1002 of the entire historical coarse edge count 800B is shown. On the right side of FIG. 10A, the current coarse edge count representation 900C is shown. The subsection 1002 of the entire historical coarse edge count 300C that is highlighted with the square has the highest correlation with the current coarse edge count representation 900C shown on the right side of FIG. 5A. In the exemplary embodiment shown in FIG. 5A, the subsection 502 of the entire historical coarse edge count 300C has a correlation of approximately 0.62 with the current coarse edge count representation 400C. Thus, in the exemplary embodiment shown, there is not an exact match between the subsection 1002 and the current coarse edge count representation 900C. In the exemplary embodiment shown, this is because the LIDAR, when first initialized to obtain the current location, did not have edge data regarding all of the places that the historical coarse edge count 800B had edge data. Specifically, there were some areas of the area represented in the coarse edge count 900C that were shadowed by objects, such as buildings 202, fences 204, trees 206, etc. In the exemplary embodiment shown, the correlation of 0.62 is lower than the correlation of 0.89 of the exemplary embodiment shown in FIG. 5A because the lower resolution used in the example shown in FIG. 10A did not allow the coarse pixels to match up as well. The actual location is still within the subsection 1002 and can more accurately be identified by performing additional correlation between the current fine grid representation 900A and the historical fine grid 300A. In exemplary embodiments, noise and errors in the raw data can also cause the correlation to not be an exact match. In the exemplary embodiments shown, it is not necessary that the correlation be an exact match, merely that the highest correlation be used to determine the current location.

In exemplary embodiments, a two sided correlation is used, where both (1) the presence of edge pixels in the current coarse edge count representation 900C that are not in the area of the historical coarse edge count 800B being correlated; and (2) the presence of edge pixels in the area of the historical coarse edge count 800B being correlated that are not in the current coarse edge count representation 900C work to reduce the correlation between the current coarse edge count representation 900C and the area of the historical coarse edge count 800B being correlated. Two sided correlation is described in more detail below with reference to FIGS. 12A-12B.

In exemplary embodiments, a one sided correlation is used instead of a two sided correlation. In a one sided correlation, only the presence of edge pixels in the current coarse edge count representation 900C that are not in the area of the historical coarse edge count 800B being correlated work to reduce the correlation between the current coarse edge count representation 900C and the area of the historical coarse edge count 800B being correlated. The presence of edge pixels in the area of the historical coarse edge count 800B being correlated do not work to reduce the correlation between the current coarse edge count representation 900C and the area of the historical coarse edge count 800B being correlated. One sided correlation is described in more detail below with reference to FIGS. 12A-12B.

In exemplary embodiments, the correlation is performed by sliding the current coarse edge count representation 900C across the historical coarse edge count 800B so that a correlation can be performed for each (x,y) combination. In exemplary embodiments having multiple Z levels in either the current coarse edge count representation 900C or the historical coarse edge count 800B, the correlation will have to be performed for each (x,y) combination in each Z level.

In exemplary embodiments, it is not necessary to perform the correlation through all degrees of rotation because the navigation system 100 has information from the inertial sensors or other aiding sources 112, such as a magnetic compass or GPS to know what the current orientation of the system was at a particular time and to be able to compensate for any differences in the reference frame orientation of the third current coarse edge count representation 900C and the reference from orientation of the historical coarse edge count 800B.

FIG. 10B shows the location of the subsection 1002 within the environment 200 on the historical fine grid 300A based on the correlation results of FIG. 10A. On the left side of FIG. 5B, the historical fine grid 300A is shown. On the right side of FIG. 10B, the current fine grid representation 900A is shown. The subsection 1002 of the historical fine grid 300A that is highlighted with the square is selected based on the correlation described above. In exemplary embodiments, a second correlation is performed by the processor 102 between the current fine grid representation 900A and the subsection 1002 of the historical fine grid to determine the precise location of the navigation system 100 within the subsection 502 of the historical fine grid.

FIG. 10C shows the location of the subsection 1002 within the environment 200 on the top view of the exemplary environment 200 in which navigation system 100A (or navigation system 100B) operates. The subsection 502 of the environment 200 is that is highlighted with the square is selected based on the correlation described above. As described above, in exemplary embodiments, a second correlation is performed by the processor 102 between the current fine grid representation 900A and the subsection 1002 of the historical fine grid 300A to determine the precise location of the navigation system 100 within the subsection 502 of the historical fine grid.

In exemplary embodiments, a tiered approach is used, starting with correlation using higher levels of coarseness, such as described in FIG. 10A-10C and further refining the area with lower levels of coarseness, such as described in FIG. 5A-5C. Thus, the location of the system 100 can be generally determined in a large geographic area and subsequently more precisely determined within a smaller geographic sub-area within the large geographic area while minimizing processing overhead by not requiring a more precise analysis in the larger geographic area.

Figure 11A:
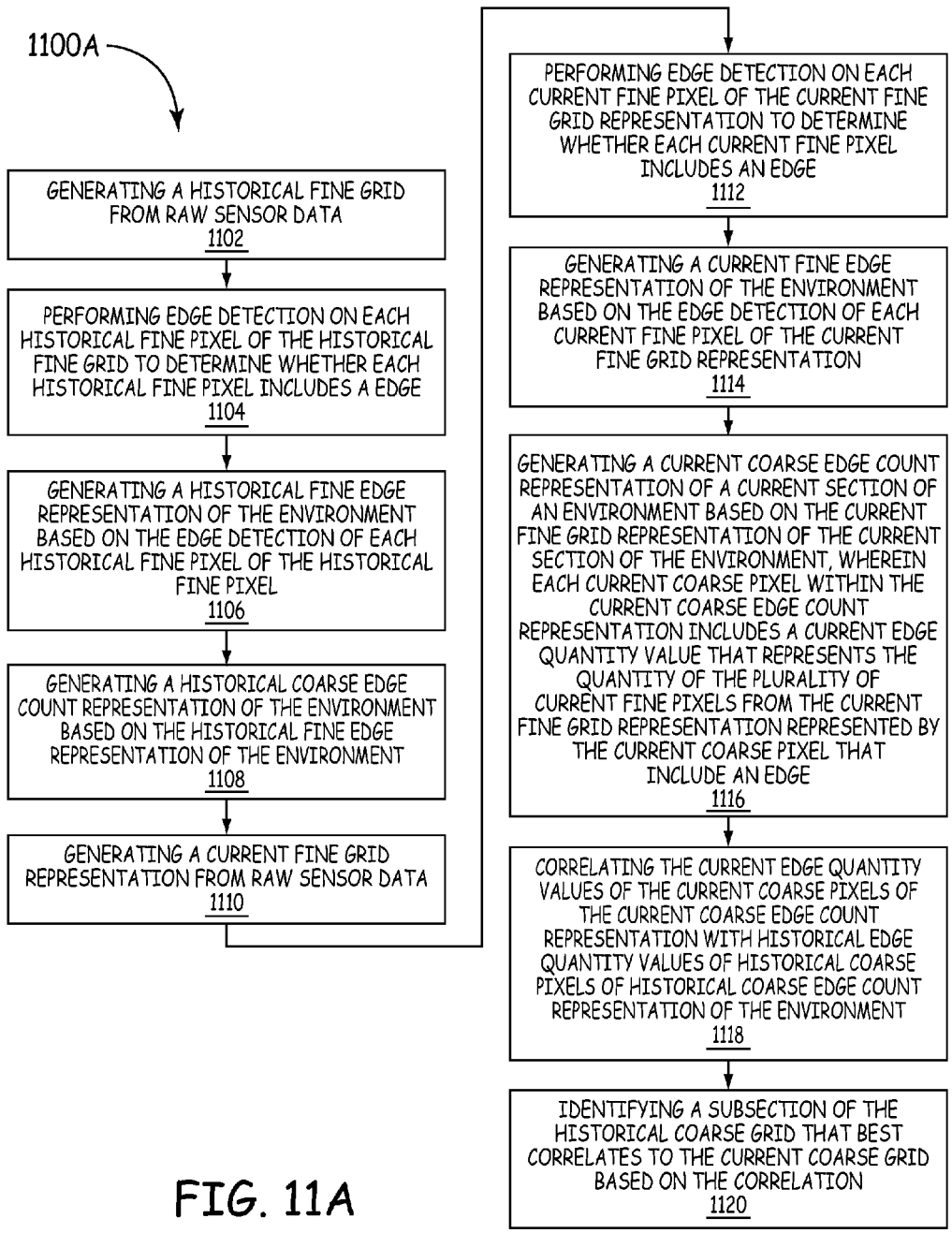
FIGS. 11A-11C are flow charts illustrating example methods for performing the rapid LIDAR image correlation for ground navigation.
Figure 11B:
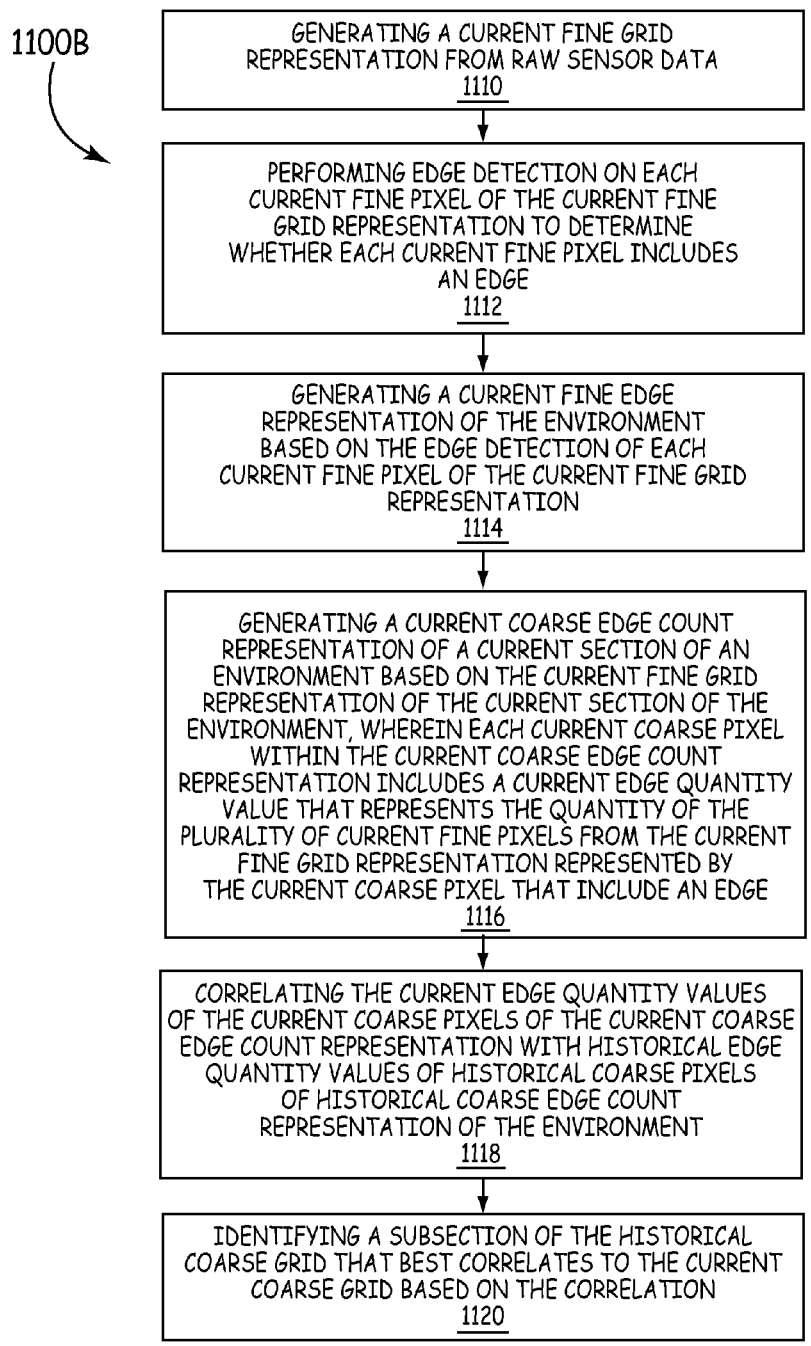
Figure 11C:
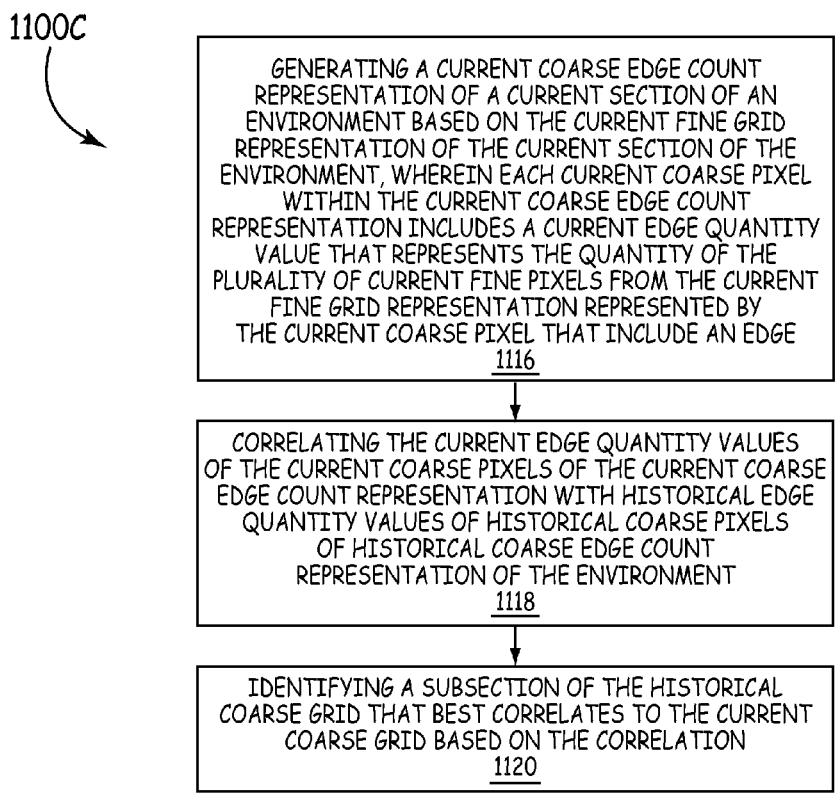

FIGS. 11A-11C are flow charts illustrating example methods 1100 for performing rapid image correlation for navigation. Each of FIGS. 11A-11C illustrates a different embodiment of the method 1100 labeled 1100A-1100C.

FIG. 11A is a flow chart illustrating one embodiment of a method 1100A for performing rapid image correlation for navigation. At block 1102, a historical fine grid (such as, but not limited to, historical fine grid 300A shown in FIG. 3A) of an environment (such as, but not limited to, environment 200 shown in FIG. 2) is generated from raw sensor data.

In exemplary embodiments, the historical fine grid is generated during times of GPS enabled navigation using a LIDAR sensor (such as, but not limited to, LIDAR sensor 106 shown in FIG. 1A) or other range and attitude sensor (such as, but not limited to, range and attitude sensor 118 shown in FIG. 1B) where the raw sensor data from the LIDAR sensor (or other range and attitude sensor) is identified as being at particular coordinates based on the GPS signal and is used to generate the historical fine grid. In exemplary embodiments, the GPS signal is supplied from a GPS receiver that is a part of the other aiding sources 112.

In exemplary embodiments, the historical fine grid is generated by a processor (such as, but not limited to, processor 102 of navigation system 100A or 100B) using inertial sensor data from inertial sensors (such as, but not limited to, inertial sensors 108 shown in FIGS. 1A-1B) or an inertial sensor unit or system.

In exemplary embodiments, as current sensor errors add onto earlier errors in the historical fine grid as its being generated, the accuracy of the location estimate can degrade. In exemplary embodiments, if a location within the environment is intentionally or unintentionally revisited, then these sensor errors can be reduced and corrections made to the stored historical fine grid by using the improved location estimates.

At block 1104, edge detection is performed on each historical fine pixel of the historical fine grid to determine whether each historical fine pixel includes an edge. In exemplary embodiments, edge detection is performed by a processor (such as, but not limited to, the processor 102 of navigation system 100A or 100B).

At block 1106, a historical fine edge representation of the environment is generated based on the edge detection of each historical fine pixel of the historical fine grid. In exemplary embodiments, the historical fine edge representation is generated by a processor (such as, but not limited to, the processor 102 of navigation system 100A or 100B).

At block 1108, a historical coarse edge count representation of the environment is generated based on the historical fine edge representation of the environment. In exemplary embodiments, each coarse pixel of the historical coarse edge count representation includes a plurality of pixels from the historical fine edge representation of the environment. In exemplary embodiments, each coarse pixel of the historical coarse edge count representation includes an integer value representing the quantity of fine pixels of the historical fine edge representation within the particular coarse pixel that have edges.

At block 1110, a current fine grid representation (such as, but not limited to, current fine grid representation 400A, 600A, or 900A) of the environment (such as, but not limited to, environment 200 shown in FIG. 2) is generated from raw sensor data. In exemplary embodiments, the current fine grid representation is generated by a processor (such as, but not limited to, processor 102 of navigation system 100A or 100B) using raw sensor data provided by a LIDAR sensor (such as, but not limited to, LIDAR sensor 106 shown in FIG. 1A) or other range and attitude sensor (such as, but not limited to, range and attitude sensor 118 shown in FIG. 1B) where the raw sensor data from the LIDAR sensor (or other range and attitude sensor) is identified as being at particular coordinates based on the GPS signal and is used to generate the current fine grid representation.

At block 1112, edge detection is performed on each current fine pixel of the current fine grid representation to determine whether each current fine pixel includes an edge. In exemplary embodiments, edge detection is performed by a processor (such as, but not limited to, the processor 102 of navigation system 100A or 100B).

At block 1114, a current fine edge representation of the environment is generated based on the edge detection of each current fine pixel of the current fine grid representation. In exemplary embodiments, the current fine edge representation is generated by a processor (such as, but not limited to, the processor 102 of navigation system 100A or 100B).

At block 1116, a current coarse edge count representation of a current section of the environment is generated based on the current fine edge representation of the environment. In exemplary embodiments, each coarse pixel of the current coarse edge count representation includes a plurality of pixels from the current fine edge representation of the environment. In exemplary embodiments, the fine grid representation of the current section of the environment is based on data from a range and attitude sensor capable of generating signals relating to the location of at least one object in a current section of the environment. In exemplary embodiments, each current coarse pixel within the current coarse edge count representation includes a current edge quantity value that represents the quantity of the plurality of current fine pixels from the current fine grid representation represented by the current coarse pixel that include an edge. In exemplary embodiments, each coarse pixel of the current coarse edge count representation includes an integer value representing the quantity of fine pixels of the current fine edge representation within the particular coarse pixel that have edges. In exemplary embodiments, the current coarse edge count representation of the environment is generated by a processor (such as, but not limited to, the processor 102 of navigation system 100A or 100B).

At block 1118, the current edge quantity values of the current coarse pixels of the current coarse edge count representation are correlated with historical edge quantity values of historical coarse pixels of the historical coarse edge count representation of the environment. In exemplary embodiments, each coarse pixel in the historical coarse edge count representation corresponds to a plurality of historical fine pixels in a historical fine grid representation of the environment. In example embodiments, the correlation occurs using a processor (such as, but not limited to, the processor 102 of navigation system 100A or 100B). In exemplary embodiments, the correlation occurs by sliding the current coarse edge count representation over each possible location on the historical coarse edge count representation. In exemplary embodiments, the correlation occurs by rotating the current coarse edge count representation to various angles over each possible location on the historical coarse edge count representation.

In exemplary embodiments, it is detected that the system has arrived at a location that it has been at before when the current map correlates well with two locations in the historical map: the location that the system was at in the previous sample and another location in the historical map that the system had estimated was a ways away, but is in fact the same location that the system had been to before. In exemplary embodiments, the system can make corrections to a stored path and a stored historical map by using the improved location estimates.

At block 1120, a subsection of the historical coarse edge count representation that best correlates to the current coarse edge count representation is identified based on the correlation performed at block 1118.

FIG. 11B is a flow chart illustrating one embodiment of a method 1100B for performing rapid image correlation for navigation. The only difference between method 1100B of FIG. 11B and method 1100A of FIG. 11A is that method 1100B of FIG. 11B does not include blocks 1102, 1104, 1106, and 1108 included in method 1100A of FIG. 11A and is only directed toward the generation of the current fine grid representation (block 1110), edge detection (block 1112), generation of current fine edge (block 1114), generation of current coarse edge count representation (block 1116), correlating the current coarse edge count representation and the historical coarse edge count representation (block 1118), and identifying the subsection of the historical coarse edge count representation that correlates best to the current coarse edge count representation (block 1120).

FIG. 11C is a flow chart illustrating one embodiment of a method 1100C for performing rapid image correlation for navigation. The only difference between method 1100C of FIG. 11C and method 1100A of FIG. 11A is that method 1100C of FIG. 11C does not include blocks 1102, 1104, 1106, 1108, 1110, 1112, and 1114 included in method 1100A of FIG. 11A and is only directed toward the generation of current coarse edge count representation (block 1116), correlating the current coarse edge count representation and the historical coarse edge count representation (block 1118), and identifying the subsection of the historical coarse edge count representation that correlates best to the current coarse edge count representation (block 1120).

FIGS. 12A-12B are exemplary representations 1200 of historical and current data used for correlation. Each of FIGS. 12A-12B illustrates a different representation 1200, labeled 1200A-1200B respectively.

As described above, a two sided correlation causes a reduction in correlation between the current coarse edge count representation 400C and the area of the historical coarse edge count 300C being correlated based on either (1) the presence of edge pixels in the current coarse edge count representation 400C that are not in the area of the historical coarse edge count 300C being correlated; or (2) the presence of edge pixels in the area of the historical coarse edge count 300C being correlated that are not in the current coarse edge count representation 400C.

In contrast, a one sided correlation causes a reduction in correlation between the current coarse edge count representation 400C and the area of the historical coarse edge count 300C being correlated only based on the presence of edge pixels in the current coarse edge count representation 400C that are not in the area of the historical coarse edge count 300C being correlated. The presence of edge pixels in the area of the historical coarse edge count 300C being correlated do not impact the one sided correlation between the current coarse edge count representation 400C and the area of the historical coarse edge count 300C being correlated.

Either one sided or two sided correlation can be implemented into the system and methods described above. In exemplary embodiments, one sided correlation is preferred over two sided correlation because historical maps can have a large amount of data and it is undesirable that all of this data penalize the correlation.

Each of representation 1200A and representation 1200B show LIDAR return data from a historical map and the current map. Each O represents a LIDAR return in a particular pixel of the historical map and each X represents a LIDAR return in a particular pixel of the current map. Some pixels contain neither a O nor a X indicating that a LIDAR return is not present in that those for either the historical map or the current map. Some pixels contain both an O and an X indicating that LIDAR returns are present in those pixels for both the historical map and the current map. Some pixels contain only an O indicating that LIDAR returns are present in those pixels for only the historical map. Some pixels contain only an X indicating that LIDAR returns are present in those pixels for only the current map.

FIG. 12A is a representation 1200A of historical and current data used for correlation. Representation 1200A has seven pixels with both X and O, one pixel with just X and not O, and six pixels with just O and not X. Using a two sided correlation, the correlation of the historical data and current data in representation 1200A is relatively low because there are seven total pixels that do not correlate in both directions. In contrast, using a one sided correlation from the current map to the historical map, the correlation of the historical data and the current data in representation 1200A is relatively high, because there is only one pixel that does not correlate in the one direction from the current map to the historical map indicating that there is only one pixel in the current map that was not in the historical map.

FIG. 12B is a representation 1200B of historical and current data used for correlation. Representation 1200B has four pixels with both X and O, four pixels with just X and not O, and zero pixels with just O and not X. Using a two sided correlation, the correlation of the historical data and the current data in representation 1200B would be relatively low because there are four total pixels that do not correlate in both directions. Similarly, using a one sided correlation from the current map to the historical map, the correlation of the historical data and the current data in representation 1200B is relatively low, because there are four pixels that do not correlate in the one direction from the current map to the historical map indicating that there are four pixels in the current map that were not already in the historical map.

In other embodiments, other types of correlation could be used, such as, but not limited to, one way correlation in the opposite direction, from the historical map to the current map.

As used in this description, a processor (such as, but not limited to, processor 102 described above with reference to FIGS. 1A-1B) includes or functions with software programs, firmware or other computer readable instructions for carrying out various methods, process tasks, calculations, and control functions, used in the collaborative navigation systems using optical pattern analysis to determine relative locations between a host unit and a remote unit and methods for performing the optical pattern analysis of a pattern according to embodiments of the present invention.

These instructions are typically stored on any appropriate computer readable medium (such as, but not limited to, memory 104 described above with reference to FIGS. 1A-1B) used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
    a range and attitude sensor configured to generate signals relating to a geographic location of at least one object in a current section of an environment relative to the system;
    at least one processor coupled to the range and attitude sensor and configured to calculate a navigation solution based on signals received from the range and attitude sensor;
    wherein the at least one processor is configured to generate a current coarse edge count representation of the current section of an environment based on a current fine edge representation of the current section of the environment;
    wherein the current fine edge representation is based on the signals received from the sensor and includes a plurality of current fine edge pixels, wherein each current fine edge pixel represents a separate current fine edge pixel area of the current section of the environment, wherein each current fine edge pixel indicates whether an edge is present in the respective separate current fine edge pixel area associated with the respective current fine edge pixel;
    wherein the current coarse edge count representation includes a plurality of current coarse pixels, wherein each current coarse pixel represents a separate current coarse area of the current section of the environment, wherein the separate current coarse area is larger than the separate current fine edge pixel area and contains a plurality of separate current fine edge pixel areas;
    wherein each current coarse pixel in the current coarse edge count representation corresponds to a plurality of current fine grid pixels in a current fine grid representation;
    wherein each current coarse pixel in the current coarse edge count representation includes a current edge quantity value that indicates the quantity of the plurality of current fine edge pixels from the current fine edge representation corresponding to the current coarse pixel that include an edge;
    wherein the processor is configured to correlate the current edge quantity values of the current coarse pixels of the current coarse edge count representation with historical edge quantity values of historical coarse pixels of a historical coarse edge count representation of the environment, wherein each historical coarse pixel in the historical coarse edge count representation corresponds to a plurality of historical fine pixels in a historical fine grid representation of the environment;

wherein the processor is configured to identify a first subsection of the historical coarse edge count representation that has the highest correlation to the current coarse edge count representation; and wherein the processor is configured to correlate the current fine edge pixels of the current fine edge representation with a first subsection of the historical fine pixels of the historical fine grid representation that matches the first subsection of the historical coarse edge count representation to identify a geographic location of the range and attitude sensor within the first subsection of the historical fine pixels of the historical fine grid representation.

2. The system of claim 1, wherein the sensor is a LIDAR sensor.

3. The system of claim 1, wherein each current fine grid representation pixel includes a value representing a height of an object in the respective separate current fine edge pixel area of the current section of the environment.

4. The system of claim 3, wherein an edge is indicated in the current fine edge representation when two adjacent current fine grid pixels in the current fine grid representation have heights that differ by more than a threshold.

5. The system of claim 1, wherein the at least one processor is further configured to generate the current fine grid representation of the current section of the environment based on the signals relating to the geographic location of at least one object in the current section of the environment generated by the range and attitude sensor.

6. The system of claim 1, wherein the at least one processor is further configured to generate the current fine edge representation of the current section of the environment by performing edge detection between adjacent current fine grid pixels in the current fine grid representation of the current section.

7. The system of claim 1, wherein the processor is further configured to update the historical fine grid representation based on the current fine grid representation.

8. The system of claim 1, wherein the processor is further configured to generate the historical fine grid representation of the environment based on the signals relating to the geographic location of at least one object in the current section of the environment generated by the range and attitude sensor;

wherein the processor is further configured to generate the historical fine edge representation of the environment based on a comparison of adjacent historical fine grid pixels in the historical fine grid representation of the environment; and wherein the processor is further configured to generate the historical coarse edge count representation of the environment based on the historical fine edge representation of the environment.

9. A method comprising:

generating, by at least one processor, a current coarse edge count representation of a current section of an environment based on a current fine grid representation of the current section of the environment, wherein each current coarse pixel in the current coarse edge count representation represents a plurality of current fine pixels from the current fine grid representation, wherein the fine grid representation of the current section of the environment is based on data from a range and attitude sensor capable of generating signals relating to a geographic location of at least one object in a current section of the environment;

wherein each current coarse pixel within the current coarse edge count representation includes a current edge quantity value that represents the quantity of the plurality of current fine pixels from the current fine grid representation represented by the current coarse pixel that include an edge;

correlating, by the at least one processor, the current edge quantity values of the current coarse pixels of the current coarse edge count representation with historical edge quantity values of historical coarse pixels of a historical coarse edge count representation of the environment, wherein each historical coarse pixel in the historical coarse edge count representation corresponds to a plurality of historical fine pixels in a historical fine grid representation of the environment;

identifying, by the at least one processor, a first subsection of the historical coarse edge count representation that has the highest correlation to the current coarse edge count representation; and correlating the current fine pixels of the current fine grid representation with a first subsection of the historical fine pixels of the historical fine grid representation that matches the first subsection of the historical coarse edge count representation to identify a geographic location of the range and attitude sensor within the first subsection of the historical fine pixels of the historical fine grid representation.

10. The method of 9, wherein each current fine grid representation pixel includes a value representing a height of an object in the respective separate current fine edge pixel area of the current section of the environment.

11. The method of claim 9, wherein an edge is indicated in the current fine edge representation when two adjacent current fine grid pixels in the current fine grid representation have heights that differ by more than a threshold.

12. The method of claim 9, further comprising:

generating, by the at least one processor, the current fine grid representation of the current section of the environment based on the signals relating to the geographic location of at least one object in the current section of the environment generated by the range and attitude sensor.

13. The method of claim 9, further comprising:

generating, by the at least one processor, the current fine edge representation of the current section of the environment by performing edge detection between adjacent current fine grid pixels in the current fine grid representation of the current section.

14. The method of claim 9, wherein correlating the current edge quantity values with the historical edge quantity values is only impacted by the presence of edges in current coarse pixels that are not in historical coarse pixels.

15. The method of claim 9, further comprising:

generating, by the at least one processor, the historical fine grid representation of the environment based on the signals relating to the geographic location of at least one object in the current section of the environment generated by the range and attitude sensor;

generating, by the at least one processor, the historical fine edge representation of the environment based on a comparison of adjacent historical fine grid pixels in the historical fine grid representation of the environment; and generating, by the at least one processor, the historical coarse edge count representation of the environment based on the historical fine edge representation of the environment.

16. A system comprising:
a LIDAR sensor configured to generate signals relating to a geographic location of at least one object in a current section of an environment relative to the system;
a processor coupled to the LIDAR sensor and configured to calculate a navigation solution based on signals received from the LIDAR sensor;
wherein the processor is configured to generate a current fine grid representation of the current section of the environment based on the signals relating to the geographic location of the at least one object in the current section of the environment generated by the LIDAR sensor, wherein the current fine grid representation includes a plurality of current fine grid pixels, wherein each current fine grid representation pixel includes a value representing a height of an object in a separate current fine edge pixel area of the current section of the environment;
wherein the processor is configured to generate a current fine edge representation of the current section of the environment by performing edge detection between adjacent current fine grid pixels in the current fine grid representation of the current section;
wherein the current fine edge representation includes a plurality of current fine edge pixels, wherein each current fine edge pixel represents the respective separate current fine edge pixel area of the current section of the environment, wherein each current fine edge pixel indicates whether an edge is present in the respective separate current fine edge pixel area associated with the respective current fine edge pixel;
wherein the processor is configured to generate a current coarse edge count representation of the current section of the environment based on the current fine edge representation of the current section of the environment;
wherein the current coarse edge count representation includes a plurality of current coarse pixels, wherein each current coarse pixel represents a separate current coarse area of the current section of the environment, wherein the separate current coarse area is larger than the separate current fine edge pixel area and contains a plurality of separate current fine edge pixel areas;
wherein each current coarse pixel in the current coarse edge count representation corresponds to a plurality of current fine grid pixels in a current fine grid representation;
wherein each current coarse pixel in the current coarse edge count representation includes a current edge quantity value that indicates the quantity of the plurality of current fine edge pixels from the current fine edge representation corresponding to the current coarse pixel that include an edge;
wherein the processor is configured to correlate the current edge quantity values of the current coarse pixels of the current coarse edge count representation with historical edge quantity values of historical coarse pixels of a historical coarse edge count representation of the environment, wherein each historical coarse pixel in the historical coarse edge count representation corresponds to a plurality of historical fine pixels in a historical fine grid representation of the environment;
wherein the processor is configured to identify a first subsection of the historical coarse edge count representation that has the highest correlation to the current coarse edge count representation; and
wherein the processor is configured to correlate the current fine edge pixels of the current fine edge representation with a first subsection of the historical fine pixels of the historical fine grid representation that matches the first subsection of the historical coarse edge count representation to identify a geographic location of the LIDAR sensor within the first subsection of the historical fine pixels of the historical fine grid representation.

17. The system of claim 16, wherein each current fine grid representation pixel includes a value representing a height of an object in the respective separate current fine edge pixel area of the current section of the environment.

18. The system of claim 16, wherein an edge is indicated in the current fine edge representation when two adjacent current fine grid pixels in the current fine grid representation have heights that differ by more than a threshold.

19. The system of claim 9, wherein the processor is configured to correlate the current edge quantity values with the historical edge quantity values only based on the presence of edges in current coarse pixels that are not in historical coarse pixels.

20. The system of claim 16, wherein the processor is further configured to generate the historical fine grid representation of the environment based on the signals relating to the geographic location of at least one object in the current section of the environment generated by the range and attitude sensor;
wherein the processor is further configured to generate the historical fine edge representation of the environment based on a comparison of adjacent historical fine grid pixels in the historical fine grid representation of the environment; and
wherein the processor is further configured to generate the historical coarse edge count representation of the environment based on the historical fine edge representation of the environment.

* * * * *